US012755162B2

(12) United States Patent
Zhou et al.

(10) Patent No.: US 12,755,162 B2
(45) Date of Patent: Oct. 6, 2026

(54) SYSTEM OPTIMIZATION BASED ON ITERATIVE SPECIFICATION OF OPERATIONAL CONSTRAINTS

(71) Applicant: International Business Machines Corporation, Armonk, NY (US)

(72) Inventors: Nianjun Zhou, Chappaqua, NY (US); Viktoriia Kusherbaeva, Calgary (CA); Dharmashankar Subramanian, White Plains, NY (US); Xiang Ma, Vancouver (CA); Jacqueline Williams, Calgary (CA); Nathaniel Mills, Coventry, CT (US)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 17/231,064

(22) Filed: Apr. 15, 2021

(65) Prior Publication Data

US 2022/0335308 A1 Oct. 20, 2022

(51) Int. Cl.
*G06N 5/02* (2023.01)
*G06F 17/11* (2006.01)

(52) U.S. Cl.
CPC ............... *G06N 5/02* (2013.01); *G06F 17/11* (2013.01)

(58) Field of Classification Search
CPC .... G06N 5/02; G06F 17/11; G06Q 10/06375; G06Q 10/0639; G06Q 50/04; G06Q 10/067
See application file for complete search history.

(56) References Cited

U.S. PATENT DOCUMENTS 7,363,280 B2 4/2008 Jin
7,536,364 B2 5/2009 Subbu
(Continued)

FOREIGN PATENT DOCUMENTS

CN 106339778 A 1/2017
WO 2019080354 A1 5/2019

OTHER PUBLICATIONS

Stenmark, M. (2011). A graphical user interface for polyethylene production grade changes. ISSN 0280-5316. (Year: 2011).*
(Continued)

*Primary Examiner* — Usmaan Saeed
*Assistant Examiner* — Hyungjun B Yi
(74) *Attorney, Agent, or Firm* — Kristofer Haggerty

(57) ABSTRACT

A system and method for determining parameters for a system. Selectable questions with associated goal are presented. Operational goals are different from configurable parameters of the system. A question is selected and a goal indication is received. First values for each goal are determined by an optimization engine adjusting parameters of mathematical models for the system to improve a value of the goal associated with the selected question in a direction of the goal indication. Selectable questions and the first values are presented and selection of a second question and a second goal indication is received. An optimization engine determines second updated values by adjusting parameters of the mathematical model to improve a value of a goal associated with the second selected question in the direction of the second goal indication. Second updated values of the goals, and differences from the first updated values. are presented.

10 Claims, 10 Drawing Sheets

(56) References Cited

U.S. PATENT DOCUMENTS

| | | | | |
|---|---|---|---|---|
| 7,542,932 | B2 | 6/2009 | Chalermkraivuth | |
| 8,417,360 | B2 | 4/2013 | Sustaeta | |
| 8,560,827 | B1 * | 10/2013 | Yiftachel | G06Q 10/067 715/239 |
| 8,639,481 | B2 | 1/2014 | Dotan | |
| 9,729,639 | B2 | 8/2017 | Sustaeta | |
| 10,082,773 | B2 | 9/2018 | Zheng | |
| 10,877,654 | B1 * | 12/2020 | Speare | G06F 16/26 |
| 11,055,639 | B1 * | 7/2021 | Cay | G06F 9/547 |
| 2003/0055718 | A1 * | 3/2003 | Cimini | G06Q 10/06 705/7.41 |
| 2006/0235778 | A1 * | 10/2006 | Razvi | G06Q 10/10 705/35 |
| 2007/0166674 | A1 * | 7/2007 | Kochunni | G09B 7/02 434/236 |
| 2010/0100216 | A1 | 4/2010 | Ames, II | |
| 2012/0029661 | A1 * | 2/2012 | Jones | G05B 19/41865 700/17 |
| 2012/0041910 | A1 | 2/2012 | Ludik | |
| 2012/0253860 | A1 | 10/2012 | Siddappa | |
| 2013/0103420 | A1 * | 4/2013 | Massoumi | G16H 10/60 705/3 |
| 2015/0004588 | A1 * | 1/2015 | Vats | G09B 7/02 434/350 |
| 2016/0252897 | A1 * | 9/2016 | Ashok | G05B 19/4155 700/275 |
| 2018/0082198 | A1 * | 3/2018 | Thompson | G06N 3/126 |
| 2018/0130003 | A1 * | 5/2018 | Sublett | G16H 15/00 |
| 2018/0330300 | A1 * | 11/2018 | Runkana | G05B 15/02 |
| 2019/0108579 | A1 * | 4/2019 | Chowdhary | G06Q 30/0611 |
| 2019/0236508 | A1 * | 8/2019 | Sage | G06Q 50/04 |
| 2019/0354093 | A1 * | 11/2019 | Nguyen | G05B 19/4183 |
| 2023/0077665 | A1 * | 3/2023 | Kuttimalai | G06F 17/11 700/90 |

OTHER PUBLICATIONS

Schulz, T., & Chelaru, A. (2013). Model Driven Key Performance Indicators Concepts for Manufacturing Execution Systems. Applied Mechanics and Materials, 245, 173-178. (Year: 2013).*

Fazlollahi et al., "Adaptive decision support systems", https://www.sciencedirect.com/science/article/abs/pii/S0167923697000146, Aug. 1997.

Seung-Jun Shin et al., "Developing a decision support system for improving sustainability performance of manufacturing processes", Springer Science+Business Media New York, Jul. 16, 2014.

Rintanen, et al., An Overview Of Recent Algorithms For Ai Planning, Artificial Intelligence, Nov. 2001, 9 pages.

Sohrabi, et al., IBMScenario Planning Advisor: Plan Recognition as Al Planning in Practice, Proceedings of the Twenty-Seventh International Joint Conference on Artificial Intelligence, 2019, pp. 5865-5867.

* cited by examiner

SYSTEM OPTIMIZATION BASED ON ITERATIVE SPECIFICATION OF OPERATIONAL CONSTRAINTS

BACKGROUND

The present disclosure generally relates to the field of controlling configurable systems and more particularly to the field of improving efficiencies of operating configurable systems within operator specified constraints.

Controlling the operation of configurable systems often involves setting various configurable operating parameters for those systems. An example of a complex configurable system is a manufacturing plant that receives a number of different types of raw materials and other inputs, has various pieces of machinery that have configurable operational parameters, has other configurable operating parameters, or combinations of these. In configuring such a manufacturing plant, values have to be determined for each of these configurable operating parameters, such as the amount each type of raw material or input, values of operational parameters of the various pieces of equipment, and the values of other configurable operating parameters. The values of these configurable operational parameters are often able to be determined and adjusted based on optimizations of mathematical models that characterize the configurable operational system.

In an example, a configurable system includes a number of underlying processes that each have multiple steps that may involve physical or chemical transformations from raw material or intermediate products to the next intermediate or final product. The operation of such a configurable system is often driven at least in part by business or other operational concerns that are not easy to be directly translated to values of configurable operating parameters. For example, the operator of a configurable system may wish to limit operating costs for the plant, restrict usage of some materials, place other operating limits or requirements on the configurable system, or combinations of these. In some examples, satisfying the needs of an operator of a configurable system involves finding a solution to a multi-criterion decision-making problem in the presence of qualitative and quantitative information that lies in selecting the priorities of operational goals. In an example, the operational parameters for the configurable system are referred to herein as Key Performance Indicators (KPIs). A common challenge in configuring such a configurable system is the selection of the proper values of multiple KPIs to setup the configurable system to achieve often multiple interrelated objectives for the system. The selection of operational parameters for a configurable system may involve satisfying multiple operational objectives. Further, this multi-objective problem often varies dynamically. For example, business objectives and operating conditions are able to shift over time such that the multiple objectives are not statically defined a priori, but rather vary from point to point in time because the operating conditions vary from time to time and because the business or other operational goals and the objectives also shift from time to time.

BRIEF SUMMARY

A method for determining configurable parameters for a configurable operational system includes presenting, on a user interface, a first set of defined decision questions where each decision question has a respective associated operational goal within a number of operational goals for a configurable operational system, where any defined decision question within the first plurality of defined decision questions is selectable by a user, and where each operational goal in the number of operational goals is different from configurable operational parameters of the configurable operational system. A selection of a selected decision question within the first plurality of defined decision questions is received based on the presenting the first plurality of defined decision questions. An input via the user interface is received in association with the selected decision question as a selected goal indication. A respective updated value for each respective operational goal within the plurality of operational goals is determined where each respective updated value for each respective operational goal is determined based on an optimization engine adjusting values of configurable operational parameters used by a set of mathematical models of operations of the configurable operational system to improve a value of a respective operational goal associated with the selected decision question in a direction of the selected goal indication. A second plurality of defined decision questions is presented on the user interface based on determining the respective updated value for each respective operational goal. Each respective defined decision question in the second plurality of defined decision questions is presented in association with the respective updated value for each respective operational goal associated with the respective defined decision question in the second plurality of defined decision questions. A selection of a second selected decision question within the second plurality of defined decision question is received based on the presenting the second plurality of defined decision questions, where the second selected decision question is different than the selected decision question. A second input is received via in association with the second selected decision question the user interface as a second goal indication. A respective second updated value for each respective operational goal within the plurality of operational goals is determined where each respective second updated value for each respective operational goal is determined based on the optimization engine adjusting values of configurable operational parameters used by the set of mathematical models of operations of the configurable operational system to improve a value of a respective operational goal associated with the selected second decision question in the direction of the selected goal indication. Each respective second updated operational goal within the plurality of operational goals and a difference between each respective updated operational goal and each respective second updated operational goal is presented on the user interface based on determining the respective second updated value for each user configurable parameter.

In some examples, the method is also able to include receiving, based on the presenting the second plurality of defined decision questions, an indication of a tolerance value for a respective updated value of a tolerance value for the respective operational goal associated with the selected decision question, where determining the respective second updated value for each respective operational goal within the plurality of operational goals includes limiting a value of the respective operational goal associated with the selected decision question to within the tolerance value of the respective operational goal associated with the selected decision question. In some examples, the method may also include defining the plurality of operational goals and arranging the first plurality of defined decision questions in a hierarchical structure with each branch of the hierarchical structure setting forth a respective decision process within a plurality of operating scenarios for the configurable operational system, and where defining the first plurality of defined decision questions comprises defining an order to present the defined decision questions. In some examples, the configurable operational system is able to include a manufacturing system and method can also include defining the plurality of operational goals to comprise operational goals that cause the optimization engine to determine configurable operational parameters for the configurable operational system that drive at least one of system physical flow, chemical flow, inventory quantities, or operation smoothness. In some examples, the second plurality of defined decision questions can include the first plurality of defined decision questions with the selected decision question removed. The method in some example is able to determine the respective updated value for each respective operational goal by determining, for each respective operational goal, a time sequence of operational performance metrics, where each respective operational performance metric in the time sequence of operational performance metrics indicates a value for the respective operational performance metric during a separate time interval; and also include calculating the respective updated value for each respective operational goal by aggregating values of each operational performance metric in the time sequence of operational performance metrics for the respective updated value for the each respective operational goal. In some examples, the selected goal indication is able to be associated with at least one of a performance metric or a business constraint for the configurable operational system, where the at least one of a performance metric or a business constraint affects the respective operational goal for the selected decision question.

An apparatus for determining configurable parameters for a configurable operational system includes a processor and a memory coupled to the processor. The apparatus also includes a user interface that, when operating, is configured to present a first plurality of defined decision questions where each decision question has a respective associated operational goal within a plurality of operational goals for a configurable operational system, where any defined decision question within the first plurality of defined decision questions is selectable by a user, and where each operational goal in the plurality of operational goals is different from configurable operational parameters of the configurable operational system. The user interface, when operating, is also configured to receive, based on presentation of the first plurality of defined decision questions, a selection of a selected decision question within the first plurality of defined decision questions and receive, as a selected goal indication, an input via the user interface in association with the selected decision question. The apparatus also includes a parameter value determination processor that, when operating, is configured to determine a respective updated value for each respective operational goal within the plurality of operational goals where each respective updated value for each respective operational goal is determined based on an optimization engine adjusting values of configurable operational parameters used by a set of mathematical models of operations of the configurable operational system to improve a value of a respective operational goal associated with the selected decision question in a direction of the selected goal indication. The user interface is further configured to, when operating, present, based on a determination of the respective updated value for each respective operational goal, a second plurality of defined decision questions, where each respective defined decision question in the second plurality of defined decision questions is presented in association with the respective updated value for each respective operational goal associated with the respective defined decision question in the second plurality of defined decision questions; receive, based on presentation of the second plurality of defined decision questions, a selection of a second selected decision question within the second plurality of defined decision question, where the second selected decision question is different than the selected decision question; and receive, as a second goal indication, a second input in association with the second selected decision question. The parameter value determination processor is also configured to, when operating, determine a respective second updated value for each respective operational goal within the plurality of operational goals where each respective second updated value for each respective operational goal is determined based on the optimization engine adjusting values of configurable operational parameters used by the set of mathematical models of operations of the configurable operational system to improve a value of a respective operational goal associated with the selected second decision question in the direction of the selected goal indication; and present on the user interface, based on a determination of the respective second updated value for each user configurable parameter, each respective second updated operational goal within the plurality of operational goals and a difference between each respective updated operational goal and each respective second updated operational goal.

In some examples, the apparatus is able to include a user interface that is further configured to, when operating, receive, based on presentation of the second plurality of defined decision questions, an indication of a tolerance value for a respective updated value of a tolerance value for the respective operational goal associated with the selected decision question. The apparatus is also able to include a parameter value determination processor that is also able to be further configured to, when operating, determine the respective second updated value for each respective operational goal within the plurality of operational goals by at least limiting a value of the respective operational goal associated with the selected decision question to within the tolerance value of the respective operational goal associated with the selected decision question. In some examples, the parameter value determination processor is further configured to, when operating, define the plurality of operational goals and define the first plurality of defined decision questions, where defined decision questions in the first plurality of defined decision questions are arranged in a hierarchical structure, with each branch of the hierarchical structure setting forth a respective decision process within a plurality of operating scenarios for the configurable operational system, and where defining the first plurality of defined decision questions comprises defining an order to present the defined decision questions. In some examples, the configurable operational system is able to include a manufacturing system, and the parameter value determination processor is able to be further configured in some examples to, when operating, define the plurality of operational goals to comprise operational goals that cause the optimization engine to determine configurable operational parameters for the configurable operational system that drive at least one of system physical flow, chemical flow, inventory quantities, or operation smoothness. In some examples, the second plurality of defined decision questions is able to be the first plurality of defined decision questions with the selected decision question removed. In some examples, the apparatus is able to have a parameter value determination processor that is also able to be configured to determine the respective updated value for each respective operational goal by at least determining, for each respective operational goal, a time sequence of operational performance metrics, where each respective operational performance metric in the time sequence of operational performance metrics indicates a value for the respective operational performance metric during a separate time interval; and calculating the respective updated value for each respective operational goal by aggregating values of each operational performance metric in the time sequence of operational performance metrics for the respective updated value for the each respective operational goal. In some examples, the selected goal indication is able to be associated with at least one of a performance metric or a business constraint for the configurable operational system, where the at least one of a performance metric or a business constraint affects the respective operational goal for the selected decision question.

A computer program product for determining configurable parameters for a configurable operational system includes a storage medium readable by a processing circuit and storing instructions for execution by the processing circuit for performing a method. This method includes presenting, on a user interface, a first plurality of defined decision questions where each decision question has a respective associated operational goal within a plurality of operational goals for a configurable operational system, where any defined decision question within the first plurality of defined decision questions is selectable by a user, and where each operational goal in the plurality of operational goals is different from configurable operational parameters of the configurable operational system. This method also includes receiving, based on the presenting the first plurality of defined decision questions, a selection of a selected decision question within the first plurality of defined decision questions, receiving, as a selected goal indication, an input via the user interface in association with the selected decision question, and determining a respective updated value for each respective operational goal within the plurality of operational goals where each respective updated value for each respective operational goal is determined based on an optimization engine adjusting values of configurable operational parameters used by a set of mathematical models of operations of the configurable operational system to improve a value of a respective operational goal associated with the selected decision question in a direction of the selected goal indication. The method further includes presenting on the user interface, based on determining the respective updated value for each respective operational goal, a second plurality of defined decision questions, where each respective defined decision question in the second plurality of defined decision questions is presented in association with the respective updated value for each respective operational goal associated with the respective defined decision question in the second plurality of defined decision questions. The method also includes receiving, based on the presenting the second plurality of defined decision questions, a selection of a second selected decision question within the second plurality of defined decision question, where the second selected decision question is different than the selected decision question, receiving, as a second goal indication, a second input via the user interface in association with the second selected decision question, and determining a respective second updated value for each respective operational goal within the plurality of operational goals where each respective second updated value for each respective operational goal is determined based on the optimization engine adjusting values of configurable operational parameters used by the set of mathematical models of operations of the configurable operational system to improve a value of a respective operational goal associated with the selected second decision question in the direction of the selected goal indication. The method also includes presenting on the user interface, based on determining the respective second updated value for each user configurable parameter, each respective second updated operational goal within the plurality of operational goals and a difference between each respective updated operational goal and each respective second updated operational goal.

In some examples, the storage medium of the computer program product stores instructions for performing a method that is also able to include receiving, based on the presenting the second plurality of defined decision questions, an indication of a tolerance value for a respective updated value of a tolerance value for the respective operational goal associated with the selected decision question. In some examples, the method is able to determines the respective second updated value for each respective operational goal within the plurality of operational goals comprises limiting a value of the respective operational goal associated with the selected decision question to within the tolerance value of the respective operational goal associated with the selected decision question.

In some examples, the storage medium of the computer program product stores instructions for performing a method that is also able to include defining the plurality of operational goals, and defining the first plurality of defined decision questions, where defined decision questions in the first plurality of defined decision questions are arranged in a hierarchical structure, with each branch of the hierarchical structure setting forth a respective decision process within a plurality of operating scenarios for the configurable operational system, and where defining the first plurality of defined decision questions comprises defining an order to present the defined decision questions. In some examples, the configurable operational system includes a manufacturing system, and where the method further comprises defining the plurality of operational goals to comprise operational goals that cause the optimization engine to determine configurable operational parameters for the configurable operational system that drive at least one of system physical flow, chemical flow, inventory quantities, or operation smoothness. In some examples, the second plurality of defined decision questions is able to include the first plurality of defined decision questions with the selected decision question removed. In some examples, the storage medium of the computer program product stores instructions for performing a method that is also able to determine the respective updated value for each respective operational goal by determining, for each respective operational goal, a time sequence of operational performance metrics, where each respective operational performance metric in the time sequence of operational performance metrics indicates a value for the respective operational performance metric during a separate time interval, and calculating the respective updated value for each respective operational goal by aggregating values of each operational performance metric in the time sequence of operational performance metrics for the respective updated value for the each respective operational goal.

These methods, apparatus and computer program products advantageously address disadvantages with conventional approaches by presenting a user with a number of questions to elicit indications of operational goals for a configurable operational system, where the user is able to select which questions to answer, and in which order to answer them. Once the user has provided indications for one or more operational goals, which are able to be qualitative indicators such as "maximize" or "minimize," or quantitative values, values of the other operational goals are determined by an optimization engine using mathematical models that characterize the configurable operational system. Operational goals are generally different than configurable operational parameters of the system and are generally focused on the interests of users with skills, knowledge, interests, or combinations of these that differ from determining configuration parameters for the system. For example, operational goals may be business oriented quantities, financially oriented quantities, other types of information, or combinations of these. The presented questions are generally worded to be understood by persons with these different skills, knowledge, and interests. Allowing the user to control the questions to be answered and the order in which they are answered, the user is able to better control the priority with which the various configurable parameters are set.

In some examples, these advantages are amplified by allowing tolerances to be specified for operational parameters, where the tolerances set limits for values of that operational parameter for subsequent iterations of the optimization process and configurable operational parameter determinations. Further advantages are provided in some examples by allowing the definition of questions that are posed to the user that are directed to the interests or analyses performed by various types of users or directed to particular types of operational goals such as system physical flow, chemical flow, inventory quantities, or operation smoothness. Other advantages are able to be realized by having goal indications that are associated with business constraints for the configurable operational system. Applying these techniques to the area of determining parameters for a manufacturing system allows users to determine optimal values for user configurable parameters for the manufacturing system based on answering questions that the user is able to select from a set of all available questions. In some examples, once a user has provided an indication for a particular operational goal and new operational goal values are determined based on that user provided indication, the question associated with the user selected operational goal is removed to advantageously focus the user's attention on operational goals that have not yet been set. In some examples, additional benefits include directing a user to answer questions that are presented in a hierarchical structure, where each branch of the hierarchical structure sets forth a respective decision process within a plurality of operating scenarios for the configurable operational system. In some examples, additional benefits that support defining operational goals according to the needs of some operators of the operational system are achieved by allowing the definition of an operational profile over time for the operational system by determining a time sequence of operational performance metrics that indicate a value for the respective operational performance metric during each of separate time intervals.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various examples and to explain various principles and advantages all in accordance with the present disclosure, in which.

DETAILED DESCRIPTION

Figure 1:
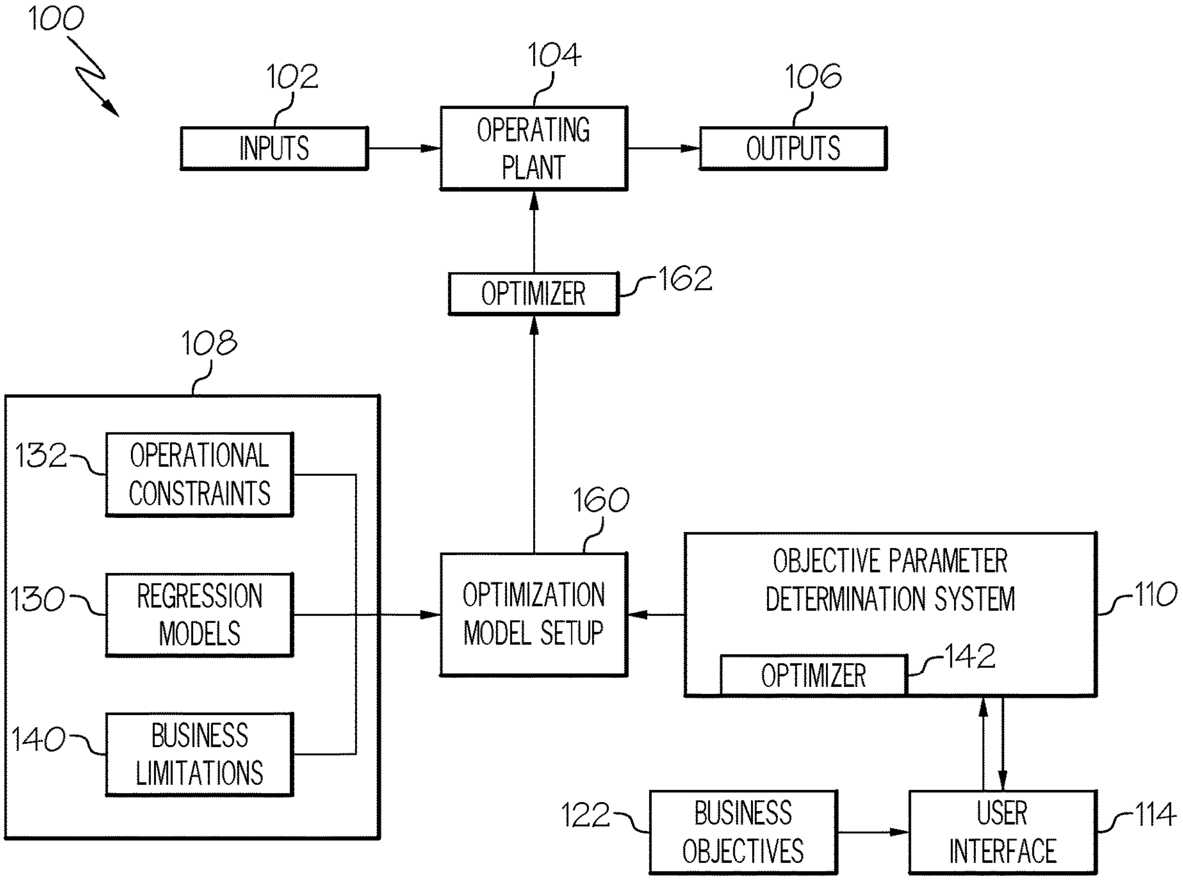
FIG. 1 illustrates a configurable operational system with configurable parameter determination system, according to an example.

The following description presents systems and methods that in an example provide operating parameter determination processes using a scenario-generation system to determine configurable parameters for a configurable operational system, such as a production-driven operation system. These operating parameter determination processes address uncertainties that are attendant in optimizing the operation of a production-driven operational system. In an example, these operating parameter determination processes support optimizing the operation of the production-driven system by assisting in the management and determination of values to be used for multiple operational aspects of a configurable operational systems, such as amounts of raw material or additives to use, operational parameters that affect the smoothness of operation of the system, other factors, or combinations of these. In various examples, as user specifies goals to be achieved for Key Performance Indicators (KPIs), which are business-oriented operational goals for a configurable operational system that are generally different than the values for some or all of these multiple values that are to be used for multiple operational aspects of that configurable operational system. These KPI goals in some examples are able to be specified as qualitative indications, such as to "maximize" or "minimize" a particular KPI, such as costs. In some examples, KPI goals are able to be specified as quantitative indications, such as limit the use of a particular input material to a specified amount. In some examples, the user who is configuring the production-driven system is able to individually specify KPI goal indications that are able to be qualitative, quantitative, or combinations of these. The systems and methods in an example include an optimization engine that determines values for the configurable operational parameters by optimizing the operation of the configurable operational system given the user specified KPI goals. In such an example, the systems and methods determine the values of the KPIs when the operations of the configurable operational system have been so optimized and presents them to the user. The user is also able to iteratively evaluate user directed modifications of the values of these the determined KPIs for various scenarios of operation of the production-driven operational system.

The below described systems and methods are able to be used to optimize operations of a configurable operating system, such as a manufacturing process, given user specified operational goals. These systems and methods allow a user to specify multiple objectives and user feedback from the user through multiple iterations of solving the optimization task with, in some examples, a single objective being specified for each iteration. These systems and methods include a process of lazy business constraints application with reduction of uncertainty in reaching multiple objectives by a multiple-step iteration optimization process. The optimization process determines values for configurable operational parameters to control the manufacturing process over a specified time interval in an example to achieve desired operation goals. In an example, the optimization process is able to provide sets of values for configurable operational parameters to be used over an X hour shift, such as an eight (8) hour shift, where each hour has a potentially different set of configurable operational parameters. In an example, each iteration is associated with feedback from the user. The feedback is able to consist of an additional operational objective or goal to be achieved and for which operational configurable parameters are to be optimized in light of the set of user specified goals, such as a business constraint that is to be applied to the previous objective that was specified in a previous iteration.

An operational goal or objective in an example is represented by a corresponding Key Performance Indicator (KPI) and prompts for indications for those operational goals can be presented to the user or a decision-maker in the form of a question. In an example, an operating parameter determination processes has a number of defined questions where each question elicits an indication of an operational goal for a configurable operating system. In an example, these defined questions are in the form of questions that address the interests of business concerns associated with the production-driven operational system and are presented to a user via a user interface that allows any question to be selected and answered. After one or more questions are answered, the operating parameter determination process determines values for other operational goals of the production-driven system by optimizing mathematical models that reflect the production-driven system's operation given the user specified operational goals. Allowing the user to select which question to answer, and thus which operational goal to specify, allows the user to select which aspects of the operation of the production-driven system are of more importance to an operational scenario that is presently being considered. Allowing the user to select the order of questions to be answered, and thus in which order operational goals are to be evaluated and optimized, advantageously allows the user in such an example to map operational concerns or priorities in the presented a UI to allow a user, such as a site-wide manager, to enter feedback in the form of constraints as the function of the solution.

After values for the other operational goals are determined given a set of one or more user specified operational goal indications, the user is able to answer other questions, change previously specified operational goal indications, or both, prior to again determining values for all of the operational goals for the production-driven system by re-optimizing the mathematical models given the newly provided user specified operational goal indications. In some examples, a user is also able to specify or re-specify allowable deviations of one or more operational goal values in order to advantageously evaluate variations that the user judges to be allowable for those operational goal values. Such iterative evaluations of user selected operational goal values, where the user selects which user selected operational goal values to select and in what order other operational goal values are to be determined, advantageously provides a user with the ability to better control the operating parameter determination process for a configurable system. The below systems and methods also allow a user to perform a multiple step feedback process that represents prompts for each of the user configurable operational goal indications for a production system in the form of questions wording that is of concern to the user. The system allows the user to answer these questions in an iterative way that also allows user feedback for the solution from each previous step. The order in which questions are selected by the user reflects their importance to the user. Each question is transformed into an objective function and is used by an optimization model that finds a solution. The system automates the decision-making process by analyzing the sensitivity of the solution.

The below described systems and methods address challenges present with conventional solutions in a number of ways. For example, allowing a user to provide values and ranges for user selected operational goal values prior to determining values for other operational goal values, and allowing the user to adjust those values for subsequent iterations, allows the user to evaluate the effect of setting the user specified operational goal values to particular values or ranges of values. These systems and methods further obviate the common conventional solution process that often includes determining weights for various parameters prior to optimization of these multiple variable problem. The below described systems and methods also obviate normalization procedures and the handling multiple user configurable parameters together. The below described systems and methods allow the user to control values of operational goals at each iteration and thereby involve the decision-maker in the configurable operational parameter determination process as a feedback path to reach improved optimization parameter values and configurable operational system configurations while ensuring that operational goal values are within ranges desired by the user.

In an example, optimizations are iteratively performed until either the user has specified indications of goals for all of the candidate operational goals, or the user is satisfied with the values of the operational goals, such as KPIs, as determined by the system given the subset of operational goals the user has already specified. At each iteration, an optimal value of the selected KPI is determined based on incorporating the operational goals that were determined during prior iterations. At each iteration, a complete set of determined operational goals values is presented to the user and the user is able to select any of the operational goals as an additional operational goal for which an indication is to be provided for another iteration of optimization and determining configurable operating parameters. In an example, at each iteration a user is able to select one or more operational goals, such as KPIs, that are different from KPIs than were selected for previous iterations, and a goal indication is able to be specified for that different KPI as an additional operational objective to consider when determining optimized configurable operational parameters. Each subsequent operational goal value in an example is calculated based on incorporating a value of the previous reviewed output into the mathematical model of operations of the configurable operational system and is presented to the user. The difference in determined operational goal values between adjacent iterations is also displayed to the user in an example. The user is then able to decide whether to perform another iteration or to stop and use the configurable operational parameter values that have been determined at that point.

Examples that illustrate the production optimization processes from different domains include determining configurable operating parameters for various industrial systems. The underlying processes generally include multiple steps that may involve, for example, a physical or chemical transformation from raw material or intermediate product to the next intermediate or to a final product. Determining the configurable operating parameters for such a configurable operating system often involves solving a multi-criterion decision-making problem in the presence of qualitative and quantitative information that lies in selecting the priorities of operational goals that are desired for the configurable operational system.

In some examples, production maximization is a top priority because it directly reflects the revenue generated. The next priority in some examples may be reducing the cost of operation by compromising acceptable quantities of additive materials. In some cases, there may be a desire to reduce the use of specific raw materials or chemical additives for various reasons, such as their potentially having high business value, e.g., have limited availability or are expensive, or are limited by the inventory storage. In an example, in addition to maximizing production and reducing costs or the use of specific raw materials or chemical additives, the operator of the configurable operating system is also able to have other objectives that have lower priorities. These include: smooth operation to avoid abrupt changes in the processes; maximization of intermediate products; minimization of intermediate additives; reduced the waste from the process; other objectives; or combinations of these.

In an application of a configurable system to process oil sands, the mined ore passes through several stages of extraction, upgrading, and refinement. The outflow from an upstream process becomes an inflow into a downstream process. There are complicated relationships between various set-points, product flows, throughput, and quality of the desired output within processing units. A production site is a complex network of these unit processes due to run-time variability in inputs, maintenance, or unexpected breakdown events, and changing business objectives. A plant operation manager needs a real-time guideline, i.e., a scenario to follow with the operation optimally and to ensure that multiple objectives are satisfied. In the majority of operation scenarios, to maximize the production is a top priority of the manufacturing process.

Plant operation managers in various examples usually face a decision dilemma and struggle with conflicting objectives. This decision dilemma is referred to herein as an "imprecision" in determining operational objectives for the configurable operational system. This imprecision concerns the uncertainty of decision-makers' preferences with respect to the objective function for determining values for the configurable parameters of a configurable operational system given the multiple and often conflicting objectives that often are placed on such systems. Examples of this arise when one objective is "more important" than another one, or there is an "undesirable" usage of some product. Such a qualitative concern must transfer quantitatively into the problem formulation.

The below described system and methods implement an approach that utilizes a user's feedback to address such imprecision and achieves a multi-criterion optimization solution through a multi-step iteration process. Addressing this imprecision allows the decisionmaker to start with more imprecision initially and work towards an acceptable solution by invoking multiple iterations during the optimization process.

The below described multi-step approach increases the solution's interpretability and, in some examples, gradually adjusts the solution to incorporate the trade-off of conflicting goals. The below described systems and methods present information at each iteration that allows the decision-maker to understand the impact of a particular change to operational goals and, thus, of the decision the decision-maker had made such as the selection of goals being optimized and each constraint being applied to arrive at the configuration of the configurable operational system. In an example, the below described systems and methods eliminate the need for weights and reflects priorities of objectives in a more direct way.

As an example of defining and optimizing an objective function for the multi-objective problem described above, the state of the configurable operational system, such as an operational plant, is represented with an L-dimension time sequence of variables $X_t$. where t indicates a time segment. The L-dimension vectors within $X_t$ in an example include the configurable operational parameters for the configurable operational system and include both dependent variables and decision variables to be used for each time segment of the plant's operation, such as time segments of one (1) hour each. The initial condition of the plant at t=0 is $x_0=\{a_1, a_2, \ldots, a_L\}$. The previous state and the current control variables determine the system's state in the next time step. Here, $u_t$ is the vector of control variables. We have: $x_t=f(x_{t-1},u_t)$.

$X_t$ are L-dimensional variable vectors representing physical or chemical parameters of the system, where $f(\cdot)$ is a given function providing a map from X×U to X. The initial condition of the plant is defined as $x_0$. The goal is to determine values for the control variable $u_t$ with $t\in[1, T]$, i.e., for the control variable ut for each time segment, such as one hour segments, to recommend to the decision maker to support the operation of the configurable operational system to achieve the specified KPIs.

The decision makers want to balance multiple objectives as $$O_k = \sum_{t=1}^{T} o_k(x_t, u_t)$$

$k\in[1, K]$ as to optimize the production, minimizing the usage of expensive materials, or to ensure the operation smoothness.

FIG. 1 illustrates a configurable operational system with configurable parameter determination system 100, according to an example. The configurable operational system with configurable parameter determination system 100 depicts an operating plant 104 that receives inputs 102 and produces outputs 106. Examples of the operating plant 104 include, for example, an operating plant or other facility engaged in manufacturing or other production systems, scenario-generation systems. In further examples, the configurable operational system with configurable parameter determination system 100 can be incorporated in any configurable system where multiple factors need to be considered in order to optimize the process, such as in the manufacturing of food, steelmaking, oil sand production facilities, or other applications. In general, the inputs 102 are able to include any number of different types of inputs, such as various ingredients, raw materials, energy to be used by the operating plant 104, other types of inputs, or combinations of these. The outputs 106 are able to include any number of different types of output, including products manufactured by the operating plant, waste materials, by-products, other outputs, or combinations of these.

The configurable operational system with configurable parameter determination system 100 further includes a parameter determination system 110. The parameter determination system 110 in an example operates with a data storage 108 and operates to execute mathematical models 130, such as regression models, that characterize the operation of various systems and subsystems in the operating plant 104. In an example, the parameter determination system 110 in an example operates with an optimizer 162 to determine values for configurable operational parameters for the operating plant 104 based on optimizing operations of the plant to achieve the user specified operational goals.

The data storage 108 in an example includes storage for mathematical models 130 that characterize and model the operation of the operating plant 104. The data storage 108 in an example also includes storage for operational constraints 132 that define limitations for the operation of the operating plant 104. The mathematical models 130 and operational constraints 132 are able to be obtained by any suitable technique such as observation of operations of the operating plant 104, based on analysis of the components of the operating plant 104, by other techniques, or combinations of these. In general, the mathematical models 130 in some examples include different mathematical models for the different subsystems within the operating plant 104. In some examples, the mathematical models 130 characterize the behavior of the operating plant 104, and also includes definitions of operational constraints on the operation of the operating plant. In some examples, the mathematical models 130 are also able to calculate values of operational goals for the operating plant, which are able to be different quantities than the configurable operating parameters of the operating plant.

The parameter determination system 110 in an example includes a parameter value determination processor that determines operating parameters 116 that are to be used to configure the operating plant 104. As is discussed in further detail below, the parameter determination system 110 in an example receives operational goal indications via a user interface 114 that indicate goals for operational parameters that are to be achieved when determining the configurable operating parameters for the operating plant 104. In an example, a user is able to specify at least one operational goal indication for a particular operational goal. In an example, evaluating that particular operational goal includes optimizing that particular operational goal via an objective function. In an example, such optimization includes the parameter determination system 110 performing an optimization model setup process 160 to configure a proper objective function to optimize one or more selected operational goals that the user has selected and for which the user has provided operational goal indications. This optimization, in an example, determines values of configurable operational parameters for the operating plant 104 that achieve the user specified operational goal indication are determined. In various examples, operational goal indications are able to be specified as qualitative indications, such as to "maximize" or "minimize," a particular operational goal. In some examples, operational goal indications are able to be specified as quantitative goals, such as a specification of a limitation of a particular amount of input material that is to be used. Such quantitative goals are able to be specified with an acceptable range around that particular value and the parameter determination system 110 will operate to determine values for configurable operating parameters for the operating plant 104 within the constraint of the user specified operational goals.

In an example, the parameter determination system 110 determines values for other operational goals, such as operational goals for which the user did not select to provide a goal indication. After performing the optimization, the parameter determination system 110 in an example displays the determined values of all operational goals on the user interface 114. The user interface 114 in an example allows a user to repeatedly provide one or more indications that each specify a particular value of a selected operational goal for the operating plant 104 in order to allow the user to add operational constraints. The parameter determination system 110 in an example then re-optimizes the configurable operational parameters based on all of the user provided constraints. In some examples, the user is able to iteratively specify goal indications for selected operational goals, re-optimize the configurable operational parameters, and evaluate the effect the various goal indications have on the operation of the operating plant 104, including how the values of other operational goals are affected by varying, adding, or removing constraints specified by goal indications. In various examples, the user interface 114 is able to be any suitable user interface, or sets of user interfaces, that allow a user to provide any suitable inputs, provide any type of suitable output to the user, or combinations of both.

The data storage 108 in an example also includes storage for business questions 140. The parameter determination system 110 in an example provides a user interface that presents questions to elicit goal indications for user selected operational goals. The parameter determination system 110 presents these questions in a form that is directed to users with knowledge of business objectives for the operation of the operating plant. These questions in an example are created by experts who are familiar with the business oriented concerns and goals.

Figure 2:
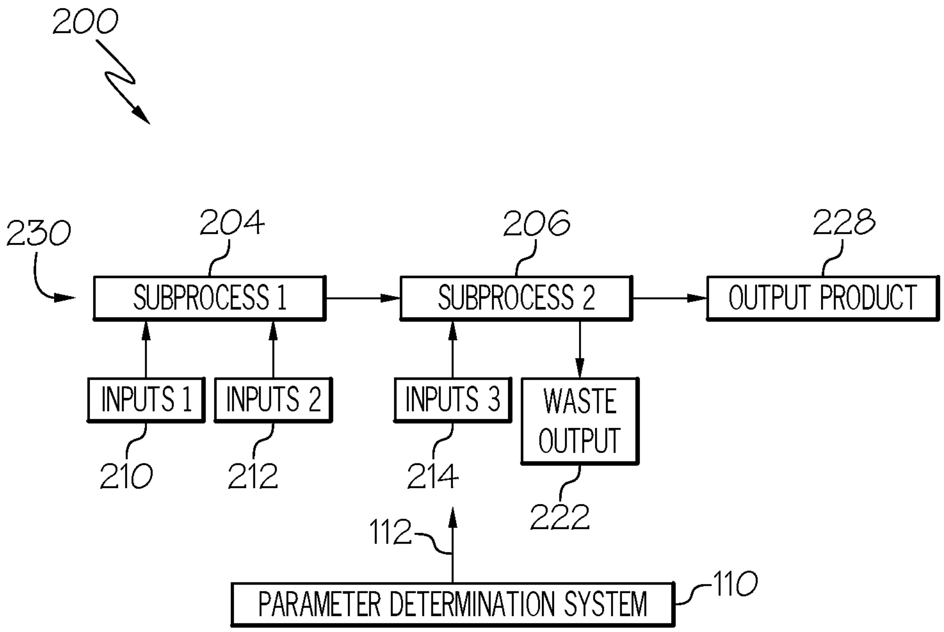
FIG. 2 illustrates a configurable system input/output flows, according to an example.

FIG. 2 illustrates a configurable system input/output flows 200, according to an example. The configurable system input/output flows 200 depict inputs and outputs of materials, consumables, energy, other components, or combinations of these, that are provided to and produced by a configurable system 230. The above-described operating plant 104 is an example of a configurable system 230. The configurable system input/output flows 200 depicts a configurable system 230 that includes two subprocesses, a subprocess 1 204 and a subprocess 2 206. In this example, the subprocess 1 204 receives input 1 210 and input 2 212 and produces an intermediate output 232 that is provided to the subprocess 2 206. In general, a configurable system is able to have any number of subprocesses that are interrelated in any manner and that accept any number of inputs and produce any number of outputs.

Input 1 210 and input 2 212 in various examples are able to include material or other elements that are used by subprocess 1 210 such as, without limitation, raw materials, energy, other inputs, or combinations of these. Subprocess 2 206 receives input 3 214 and the intermediate output 232 produced by subprocess 1 202 and in this example produces waste output 226 and output product 220.

As discussed above, the parameter determination system 110 determines values for parameters that control various aspects of the operation of the configurable system 230. In an example, a user is able to provide indications for selected operational goals that affect desired operating characteristics of the configurable system 230. For example, a user may wish to value at which quantities of input 1 210 are delivered to subprocess 1 204. In such an example, limiting this value may be desired due to any reason, such as a temporary increase in the price of input 1 210, a general desire to reduce the quantity of input 1 210 due to its cost or scarcity, shortages in an available storage of input 1 210, other reasons, or combinations of these. In an example, where a user provides a goal indication of reducing the quantity of input 1 210 that is used and delivered to subprocess 1 204. The parameter determination system 110 then determines values of configurable operating parameters for the operation of configurable system 230, such as values for input 2, 212, input 3, 214, waste output 222 and output product 220, as well as values for all of the operational goals for the configurable system 230. The user is then able to examine the values of all of the operational goals given the one or more user provided goal indications and evaluate if the resulting operating condition is acceptable. Such specifications of operational goals can be iteratively performed to evaluate alternatives and allow the user to consider and evaluate compromises for other operational goals in order to achieve particular objectives.

Figure 3:
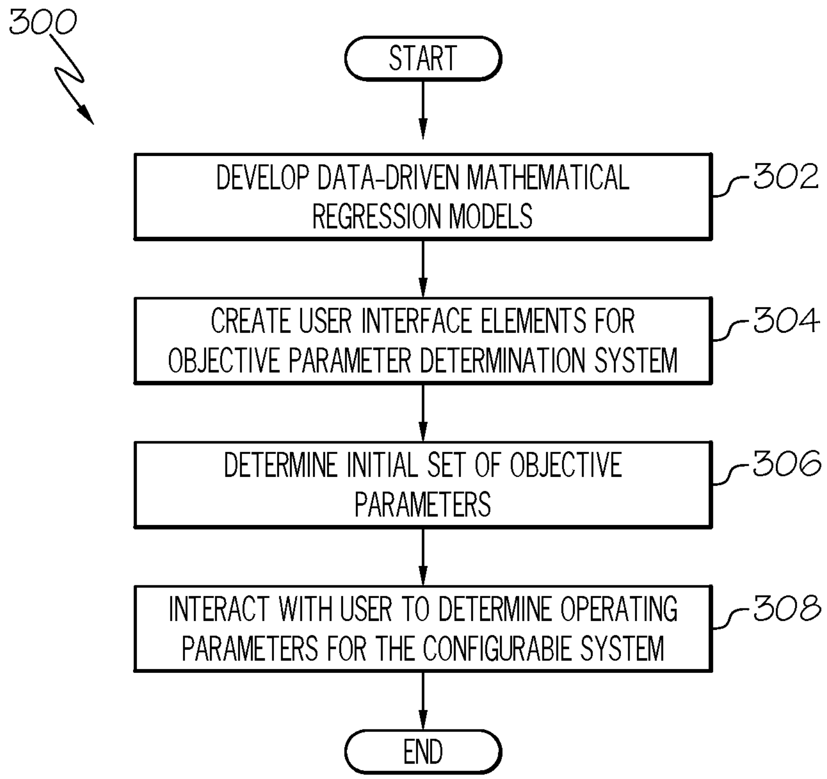
FIG. 3 illustrates a parameter determination system development and operations flow, according to an example.

FIG. 3 illustrates a parameter determination system development and operations flow 300, according to an example. The parameter determination system development and operations flow 300 depicts an example of a process to develop and deploy for operations a parameter determination system that determines configurable parameters for a configurable operational system. In an example, this parameter determination system allows a user to provide goal indications for selected operational goals and determine the values of configurable parameters of the configurable operational system by optimizing mathematical models that characterize the configurable operational system.

The following description refers to the above described example configurable operational system with configurable parameter determination system 100. It is to be understood that the concepts described below are able to be applied to processing to determine parameters for any configurable system.

The parameter determination system development and operations flow 300 develops, at 302, mathematical models that reflect the operation of the configurable operational system. In an example, the mathematical models include regression models for one or more processes within the configurable operational system that are created based on data that has been observed during operation of that system under various conditions and configurable parameter values. In further examples, various types of mathematical models are able to be developed by any suitable technique, such as by analysis of the configurable operational system.

The user interface elements for an objective parameter determination system are created, at 304. In an example, an objective parameter determination system operates to optimize the configurable operating parameters of the configurable operational system according to one or more objectives selected by a user. Creating the user interface elements includes defining a number of operational goals for which the user can provide indications, and also includes defining the first plurality of defined decision questions. In an example the defined decision questions are able to be arranged in a hierarchical structure, with a defined order in which the defined decision questions are to be answered by the user, where each branch of the hierarchical structure sets forth a different decision process within a number of operating scenarios for the configurable operational system. Defining questions in a hierarchical structure advantageously allows efficiently directing a user in providing operational goal indications information for different types of operational goals.

An initial set of objective parameters is determined, in some examples, at 306. The initial set of objective parameters, which are the initial set of values for each operational goal from which the user is able to select to provide a goal indication, is determined in an example by optimizing the mathematical models to determine the optimum values of the operational goals configurable parameters prior the user's providing any goal indications. In an example, the initial set of objective parameters is determined based on default optimization criteria, such as maximizing production for a manufacturing plant.

The parameter determination process interacts with users, at 308, to determine operating parameters for the configurable system, such as the operating plant 104. As discussed in detail below, the parameter determination process in an example is able to iteratively execute to allow a user to provide goal indications for selected operational parameters, and iteratively specify, or re-specify, indications of direction, such as maximize or minimize, a desired value, a desired value and range, or an allowable range or deviation for a previously determined operational goal including user operational goals for which the user had previously provided goal indications. The parameter determination system development and operations flow 300 then ends.

Figure 4:
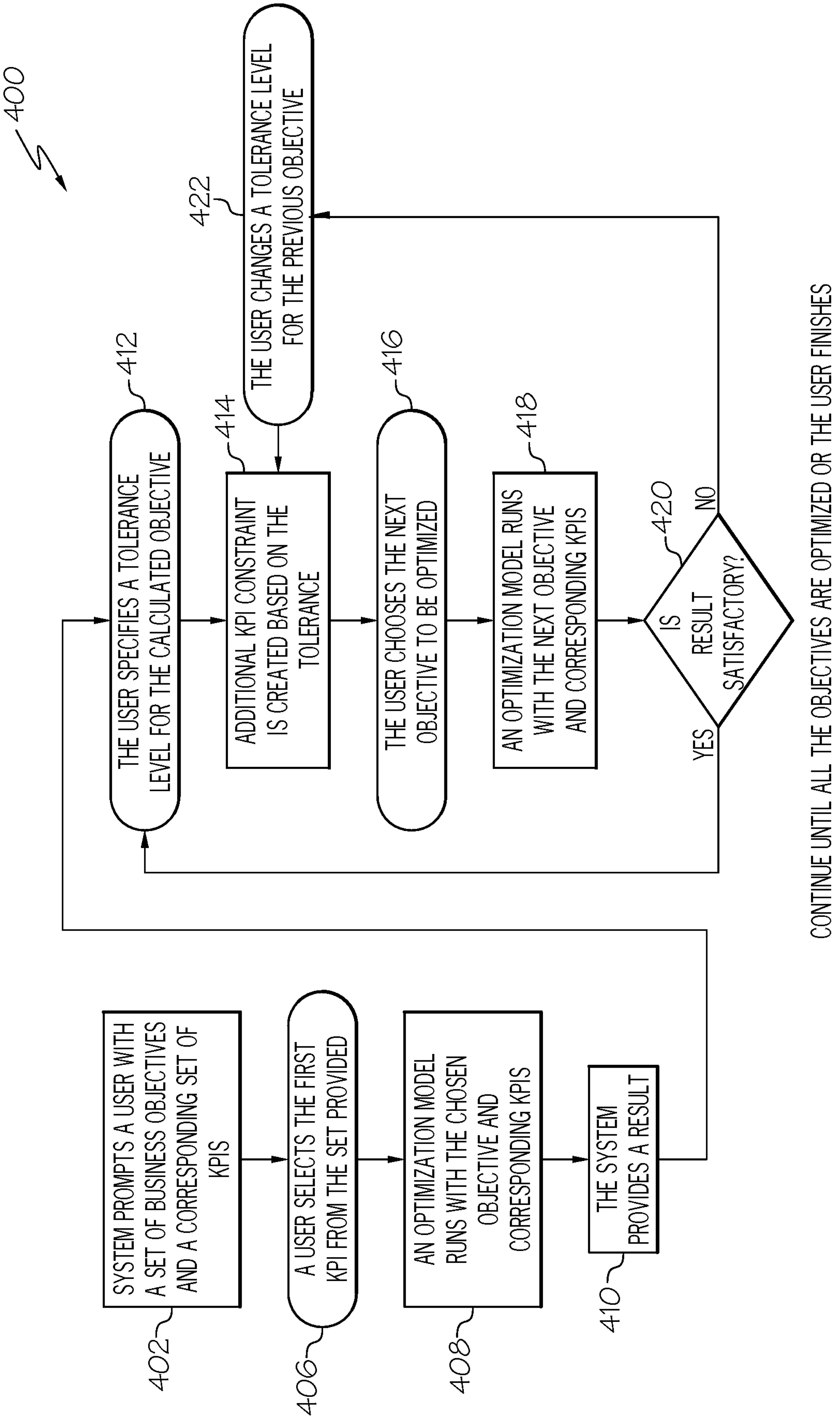
FIG. 4 illustrates a configurable parameter determination process flow, according to an example.

FIG. 4 illustrates a configurable parameter determination process flow 400, according to an example. The configurable parameter determination process flow 400 is an example of a process performed by the above described objective parameter determination system 110 and optimizer 162 in conjunction with user interface 114 to determine configurable parameter values for a configurable operational system such as the operating plant 104.

The configurable parameter determination process flow 400 prompts, at 402, a user with a set of business objectives and a corresponding set of KPIs. KPIs are an example of operational goals for the operating plant 104. In an example the set of business objectives are presented as text questions from which a user is able to select any of those questions to provide an operational goal indication.

A user selects, at 406, a first KPI from the set of KPIs presented in the provided prompt. In an example, the user is able to select a particular KPI, or operational goal, by selecting a presented question in the provided prompt.

An optimization model runs, at 408, with the chosen objective and corresponding KPIs. In an example, a chosen objective is able to be provided as a goal indication for the corresponding KPI. The system provides the determined results, at 410. In an example, the determined results include values for all KPIs, or operational goals, that result from optimizing the mathematical models according to the user provided goal indication for the selected KPI.

The user specifies a tolerance level for the calculated objective, at 412. This tolerance level is applied to the first KPI that the user had selected above. In further examples, the user is able to specify tolerance levels for any one or more operational goals. Tolerance levels for objectives, which are operational goal such as the determined KPIs, are able to be provided in any suitable format, such as such as a plus/minus value relative to the determined operation goal value, a maximum and minimum value for that operational goal, other formats, or combinations of these. Allowing a user to specify tolerances for KPIs advantageously allows the user to specify the range of values that a KPI will be restricted to when optimizing the configurable operational parameters so that the user is able to specify such values that are consistent with the user's requirements for the configurable operational system. The system responds to the specified tolerance level by creating, at 414, an additional KPI constraint based on the user specified tolerance. In an example, this additional KPI constraint limits the value of that KPI to within the specified tolerance as the optimization engine recalculates configurable parameters for the configurable operational system.

The user chooses, at 416, the next objective, i.e., operational goal, that is to be optimized. An optimization runs, at 418, with the next objective to be optimized. This choice of an operational goal and running an optimization is similar to the above described sequence, at 406 and 408.

A determination is made, at 420, if the results of the last optimization are satisfactory. In an example, all of the operational goals determined by the system are presented to the user for examination and evaluation. The user is able to judge if the results determined thus far are satisfactory for the operation of the configurable operational system. If the user judges the results to be acceptable, the configurable parameter determination process flow 400 returns to the user specifying the tolerance level for the first KPI, at 412. If the user judges the results to be acceptable, the configurable parameter determination process flow 400 returns to the user specifying the tolerance level for the first KPI, at 412. If the user judges the results to not be acceptable, the user changes, at 422, the user changes, at 422, a tolerance level for a previous objective. Such a previous objective is any operational goal that had been determined by previous executions of the optimization engine. The configurable parameter determination process flow 400 then returns to the user specifying the tolerance level for the first KPI, at 412.

Figure 5:
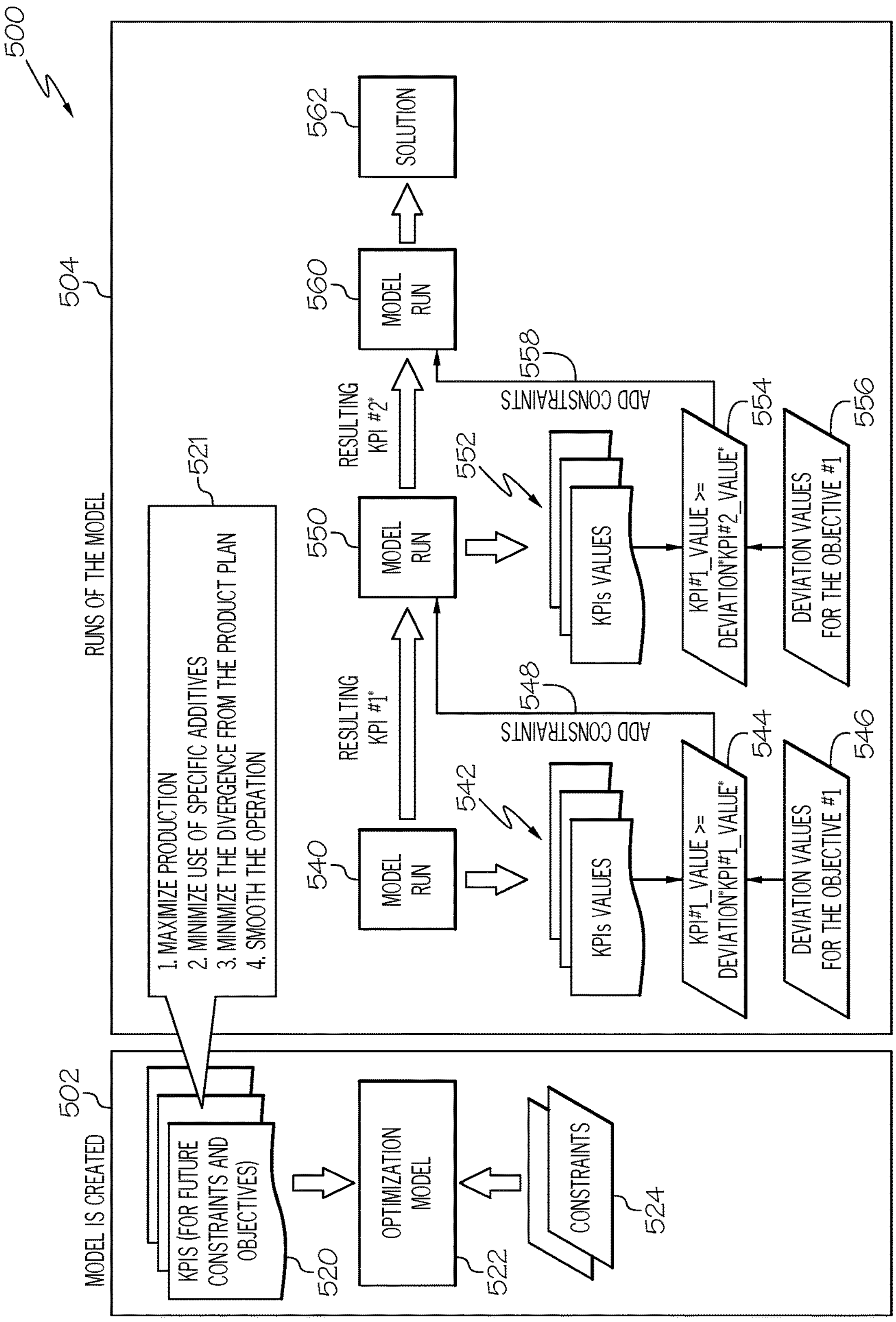
FIG. 5 illustrates an operational goal optimization process, according to an example.

FIG. 5 illustrates an operational goal optimization process 500, according to an example. The operational goal optimization process 500 is an example of a process performed by the above described objective parameter determination system 110 and optimizer 162 in conjunction with the user interface 114.

The operational goal optimization process 500 depicts a model creation flow 502 and model execution flow 504. The model creation flow 502 includes defining, at 520, the set of KPIs, which are operational goals for a configurable system. In examples, a user is able to provide operational goal indications for selected operational goals. A list of candidate goal objective indications 521 lists examples of operational goal indications that a user is able to specify that are to be used as constraints when determining operational parameters for an operational system by optimizing those parameters within the specified constraints. The model creation flow 502 also includes defining constraints 524. In examples, constraints 524 define the constraints on the operation of the configurable operational system that cannot be changed by a user. Examples of constraints define by the constraints 524 include constraints based on the physical limitations of the configurable operational system, limitations due to regulation or other sources, any other constraints that a user is not able to select or adjust as a KPI or operational goal, or combinations of these. The model creation flow 502 also includes developing an optimization model 522. The optimization model 522 in an example includes mathematical models that characterize the operation of a configurable operational system and allows determination of values for configurable parameters of that system by optimizing an objective function to improve a user selected operational goal in a direction of the user provided goal indication.

Model execution flow 504 begins with a first model run 540. The first model run 540 uses optimization model 522 to determine configurable operational parameters for the configurable operational system by optimizing those parameters according to constraints defined for the KPIs and constraints 524. In an example, the first model run 540 produces a first determined set of KPI values 542 that are calculated based on the determined configurable operational parameters that were determined based on a default set of optimization criteria. The first set of KPI values 542 includes a first KPI value, which in this example is a KPI quantity, or operational goal, for which that the user wishes to optimize the operation of the configurable operational system in accordance with a particular user provided goal indication.

The model execution flow 504 includes the user providing a first set of allowable deviation values 546 for the first KPI value, which is the first objective value to be optimized by the objective function in determining configurable operating parameters for the configurable operational system. In an example, these deviation values are user provided goal indications for the first KPI value that the user determined based on judgements concerning allowable values for operational goals. In this example, a first additional constraint 548 is specified to be included as an additional constraint on the operational goals for the configurable operational system in optimizing the configurable operational parameters that are to be determined. The first additional constraint 548 in an example is a goal indication for different operational goal, or KPI, than the first KPI.

The first determined set of KPI values 542, the user provided first set of allowable deviation values 546, and the first additional constraint 548, are provided to the second model run 550. The second model run 550 determines configurable operational parameters for the configurable operational system in a manner similar to the first model run 540 with the addition of the first additional constraint 548 and the user provided first set of allowable deviation values 546 for the first operational goal.

In an example, the second model run 550 produces a second determined set of KPI values 552 that are calculated based on the determined configurable operational parameters that were determined based on the first determined set of KPI values 542, the first additional constraint 548, and the user provided first set of allowable deviation values 546 for the first operational goal. The user in this example decides that the results are not as desired and decides to execute another iteration of optimization providing additional inputs. The user provides a second set of allowable deviation values 556 for the first KPI value, which is the objective value to be optimized by the objective function in determining configurable operating parameters for the configurable operational system. In an example, the second set of allowable deviation values 556 are an adjustment to the first set of allowable deviation values 546 that the user wants to consider because the values of the second determined set of KPI values was not acceptable to the user. In this example, a second additional constraint 558 is also specified by the user to be included as an additional constraint on the operational goals for the configurable operational system in optimizing the configurable operational parameters that are to be determined. The second additional constraint 558 in an example is a goal indication for different operational goal, or KPI, than the second KPI.

The second determined set of KPI values 552, the user provided second set of allowable deviation values 556, and the second additional constraint 558, are provided to a third model run 560. The third model run 560 determines configurable operational parameters for the configurable operational system in a manner similar to the second model run 550 with the addition of the second additional constraint 558 and the second set of allowable deviation values 556 for the first operational goal. In an example, the user determines that the set of KPIs produced by the third model run 560 are acceptable. The user in this example decides to stop iterations of the optimization process and accept the solution 562, which are values of configurable operational parameters to be used to configure the configurable operational system.

Figure 6:
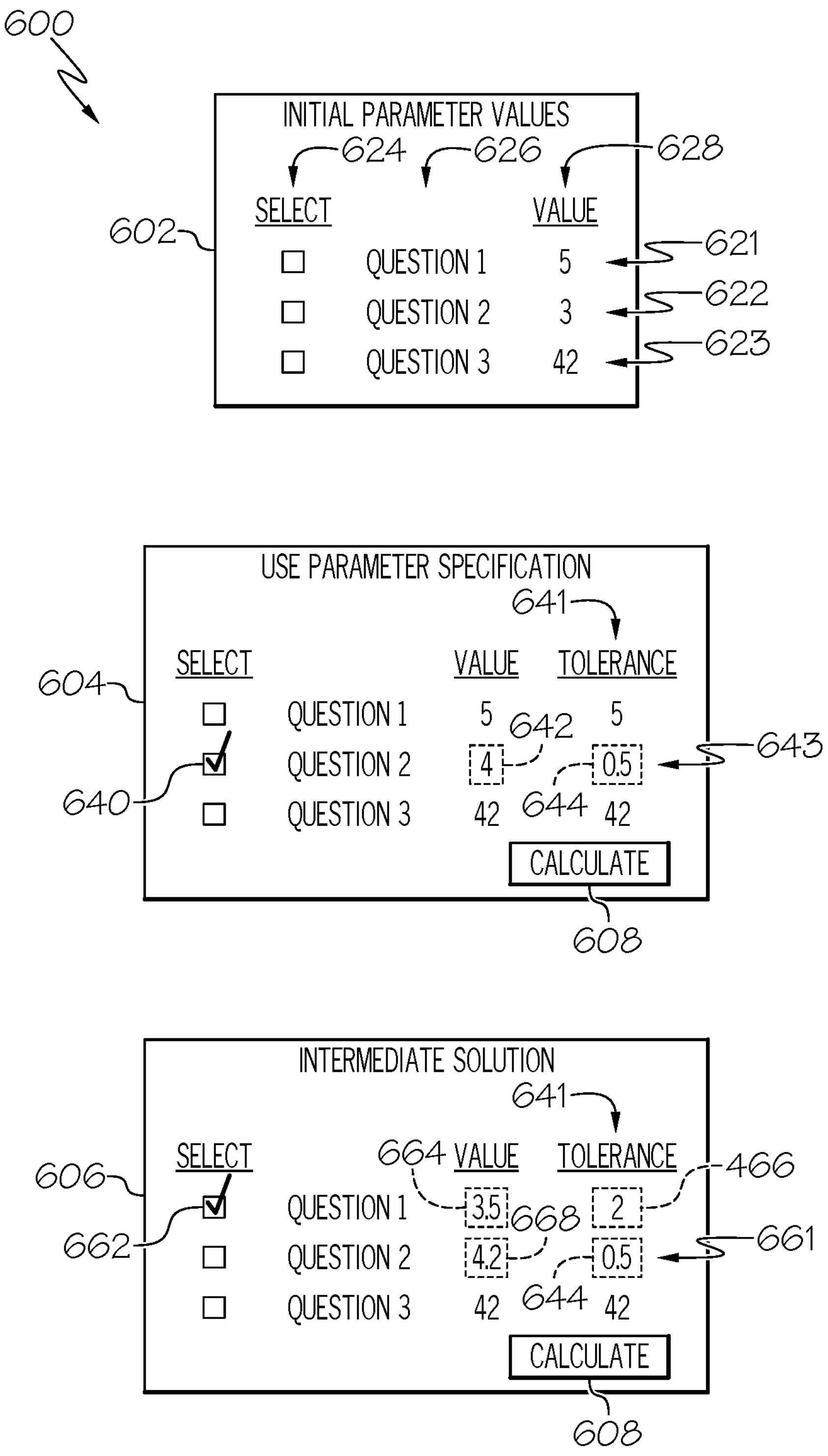
FIG. 6 illustrates a user interface progression, according to an example.

FIG. 6 illustrates a user interface progression 600, according to an example. The user interface progression 600 depicts a sequence of user interface displays presented to a user as the user is able to progressively select operational goals for a configurable operational system. The user interface progression 600 is an example of a progression of user interface displays that are created by the parameter determination system 110 and presented on the user interface 114. The user interface progression 600 depicts a progression of three (3) user interface presentation, a first user interface presentation 602, a second user interface presentation 604, and a third user interface presentation 606.

The first user interface presentation 602 presents initial operational goal values as are determined in an example based on optimizing mathematical models for the configurable operational system without user specified operational goal indications. The first user interface includes three (3) rows, a first row 621, a second row 622, and a third row 623. Each row has a "SELECT" field 624, a Question field 626, and a "VALUE" field 628. The boxes in the "SELECT" field 624 are able to receive selection indications from a user as is described below. The "VALUE" field 628 indicates the value of a particular operational goal associated with the question in the Question field 626. The set of values in the "VALUE" field 628 is an example of an initial set of operational parameters, such as were determined in the above described determining initial set of objective parameters 306.

The first user interface presentation 602 is an example of presenting, on a user interface, a plurality of defined decision questions where each decision question has a respective associated operational goal within a plurality of operational goals of a configurable operational system, where any decision question within the plurality of decision questions is selectable by a user. In an example, the order of in which question 1, question 2 and question 3 are presented on the first user interface presentation 602 is able to be defined in order to define a hierarchical structure. Questions organized in a hierarchical structure are able to be selectively presented as branches where each branch of the hierarchical structure sets forth a respective decision process within a number of operating scenarios for the configurable operational system. In such an example, the definition of the decision questions also includes defining an order in which the user interface 114 presents present the defined decision questions. Defining the order that the questions are presented to a user allows the designer of the parameter determination system to guide the user by creating a structured series of questions that flow logically for a user.

The second user interface presentation 604 presents a user provided goal indication input display that receives goal indications that are values of operational goals that are to be used as constraints for the processing to determine configurable parameter values for the configurable operational system. The modified second row 643 is shown to have its "SELECT" box checked, i.e., second select box 640, which indicates the user has selected decision question 2 as a decision question to consider for the initial iteration of configurable parameter determination. As shown in the first user interface presentation 602, the value of the operational goal associated with Question 2 was "3" as determined by the initial set of objective parameters. When the "SELECT" box for a particular row is selected by a user in an example, a value input box and tolerance input box are presented. The value input box replaced the initial value in the VALUE field and a "TOLERANCE" field 641 is added to the second user interface presentation 604 into which the tolerance input box is added. In this example, a first value box 642 and a first tolerance box 644 are added to the presentation based on the user selecting the modified second row 643. In the illustrated example, the user has changed the initial value of "3" to a user provided value of "4" by entering that number into a first value box 642. The user has also entered a tolerance of value of "0.5" into the first tolerance box 644. The user is then able to cause an optimization engine to re-determine configurable parameters, and therefrom determine the resulting values of all of the operational goals, by selecting the "CALCULATE" button 608.

The parameter determination system responds to a user's selecting the "CALCULATE" button 608 in an example by determining an updated value for each respective operational goal within the number of available of operational goals, where each updated value is determined based on an optimization engine adjusting values of configurable operational parameters used by a set of mathematical models of operations of the configurable operational system to improve a value of a respective operational goal associated with the selected decision question in a direction of the selected goal indication. Allowing the user to enter values, with or without ranges such as tolerances, for any operational goal prior to re-determining configurable parameters advantageously allows a user to better control the values of user configurable parameters that the user is most interested in controlling.

The second user interface presentation 604 depicts an example of a received value for an operational goal indication that has a respective value, as entered in the first value box 642, and a respective range, as entered in the first tolerance box 644. Allowing a user to enter values and ranges for those values advantageously allows users to select the range of values that are acceptable to the user for a particular user configurable parameter when determining an overall set of user configurable parameters for a configurable operational system. In some examples, a user is alternatively able to enter qualitative goal indications, such as "Maximize" or "Minimize," for one or more particular operational goals and the optimization engine will determine values for configurable operational parameters that correspond to optimizing those operational goals within the constraints of the other specified operational goals and the operating constraints of the configurable operational system.

In some examples, when a user selects a decision question, provides an input in response to that selected decision question, and determines an updated value for each user configurable parameter, the parameter determination system removes the selected decision question when presenting the updated values for the operational goals. Removing the previously selected decision question from the plurality of questions presented after a user has specified a value for that previously selected decision question allows the user to more clearly focus on other questions that the user has not yet selected.

The third user interface presentation 606 presents an intermediate solution display that presents values of operational goals that correspond to operational configuration parameters that were determined based on mathematical models that characterize the configurable operational system, and also allows a user to select one or more other questions for which the user wishes to provide associated goal indications that are to be used as further constraints for the processing to determine configurable parameter values for the configurable operational system. The modified first row 661 is shown to have its "SELECT" box checked, i.e., first select box 662, which indicates the user has selected decision question 1 as a decision question for which an answer, i.e., a goal indication, is to be added into consideration for the next iteration of configurable parameter determination. As shown in the first user interface presentation 602, the value of the operational goal associated with Question 1 was "5." In the illustrated example, the user has changed the initial value of "5" to "3.5" by entering that number into a second value box 664. The user has also entered a tolerance of value of "2" into the second tolerance box 666. The user is then able to re-determine configurable operational parameters by selecting the "CALCULATE" button 608.

The parameter determination system responds to a user's selecting the "CALCULATE" button 608 in an example by determining, based on incorporating a value of a second input, as represented by the value entered in to the second value box 664 and the second tolerance box 666, an updated value for each operational goal where each updated value is determined based on the optimization engine adjusting values of configurable operational parameters used by the set of mathematical models of operations of the configurable operational system to improve a value of the operational goal associated with the selected decision question in the direction of the selected goal indication. In an example, the second updated value for each user configurable parameter is displayed in a manner similar to that depicted for the third user interface.

The questions presented in the various user interface presentations, and their associated user configurable parameters, are able to be selected according to the goals of the developer of the parameter determination system. In an example, the parameter determination system determines user configurable parameters for a configurable operational system that is a manufacturing system. In such an example, the presented decision questions are able to elicit values for operational goals that drive at least one of system physical flow, chemical flow, inventory quantities, or operation smoothness. Providing questions that are directed to such goals, or goals that are directed to performance metrics or business constraints, advantageously allows users who are not familiar with the technical particulars or design of the system to specify goals of importance to such users without the assistance of technical experts familiar with the technical aspects of the operations of the configurable operational system. In some such examples, the presented decision questions are able to elicit values for parameters indicating a production objective of at least one of a final product of the manufacturing system or an intermediate product of the manufacturing system.

Figure 7:
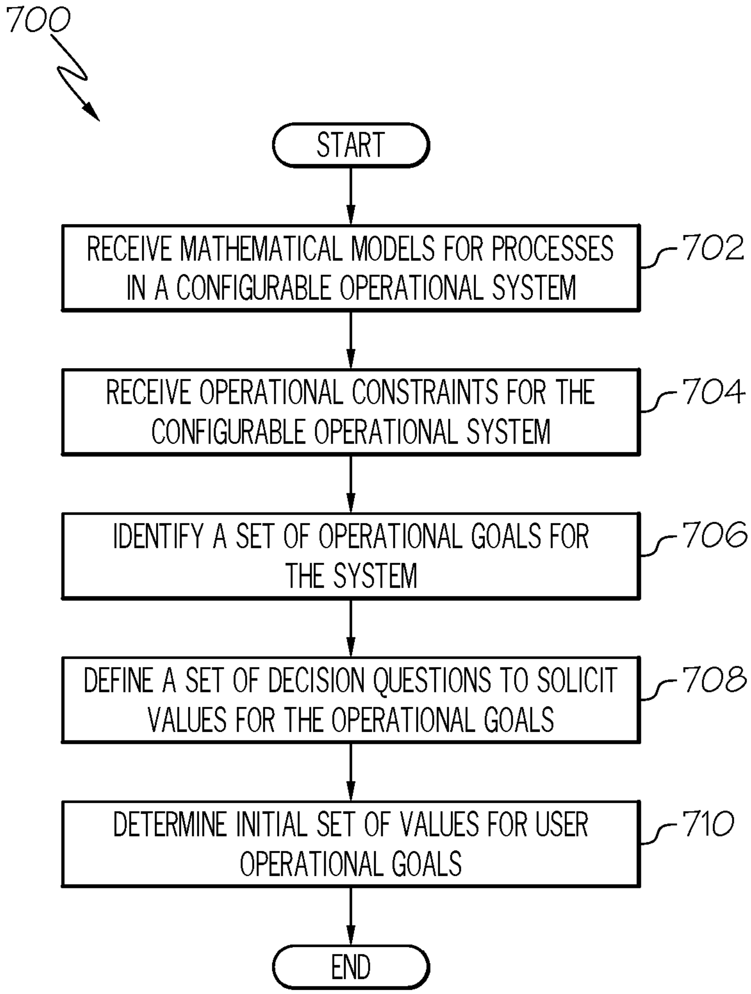
FIG. 7 illustrates a parameter determination process creation flow, according to an example.

FIG. 7 illustrates a parameter determination process creation flow 700, according to an example. The parameter determination process creation flow 700 illustrates an example of creating a parameter determination process to be performed by a parameter determination system to determine configurable parameters for a configurable operational system. In an example, the created parameter determination process is to be performed by the parameter determination system 110 discussed above. In an example, the parameter determination process creation flow 700 depicts actions by one or more engineers or other knowledgeable persons familiar with the operations of the configurable operational system.

The parameter determination process creation flow 700 receives, at 702, mathematical models that characterize one or more processes that are included in the configurable operational system, such as the operating plant 104. These mathematical models are able to be in any suitable form, such as regression models that have been developed by observing the operation of the configurable operational system with various values of configurable parameters. In general, the mathematical models each have a set of parameters that are able to be varied to reflect different operating conditions for the configurable operational system.

System operational constraints are received, at 704. Operational constraints are generally set by the design of the configurable operational system and define one or more of limits on values of parameters used by the mathematical models, interrelationships between parameters used by the mathematical models, other constraints, or combinations of these. In an example, these constraints reflect the physical limitations or design of the configurable operational system and indicate limits, relationships, other quantities, or combinations of these, that are constraints on the operation of the configurable operational system.

A set of operational goals are identified for the configurable operational system, at 706. In an example, the set of operational goals are goals that are related to business decisions or other concerns for the operation of the configurable operational system. The set of operational goals are identified in an example by the one or more people designing the parameter determination process.

A set of decision questions are defined, at 708, to elicit indications for the operational goals. In some examples, each operational goal has an associated decision question, which is a user friendly text question that asks for the indication of its associated operational goals. In an example, the decision question asks for a desired value for its associated operational goals and also for a range in which the specified desired value can vary. In such an example, the parameter determination process will then operate to determine values for the configurable parameters while maintaining that user configurable parameter within the specified range. In some examples, the decision question asks a question that is able to elicit a goal indication that can be a quantitative or qualitative answer. In some examples, the decision questions are able to be initially organized as a question tree that reflects a suggested hierarchy of parameter importance. In an example, the set of operational goals and the set of decision questions are able to be identified by a designer using the user interface 114 described above.

An initial set of values for the operational goals is determined, at 710. In an example, the initial set of values is determined by optimizing the mathematical models for the configurable operational system without receiving any inputs from a user. The parameter determination process creation flow then ends.

Figure 8:
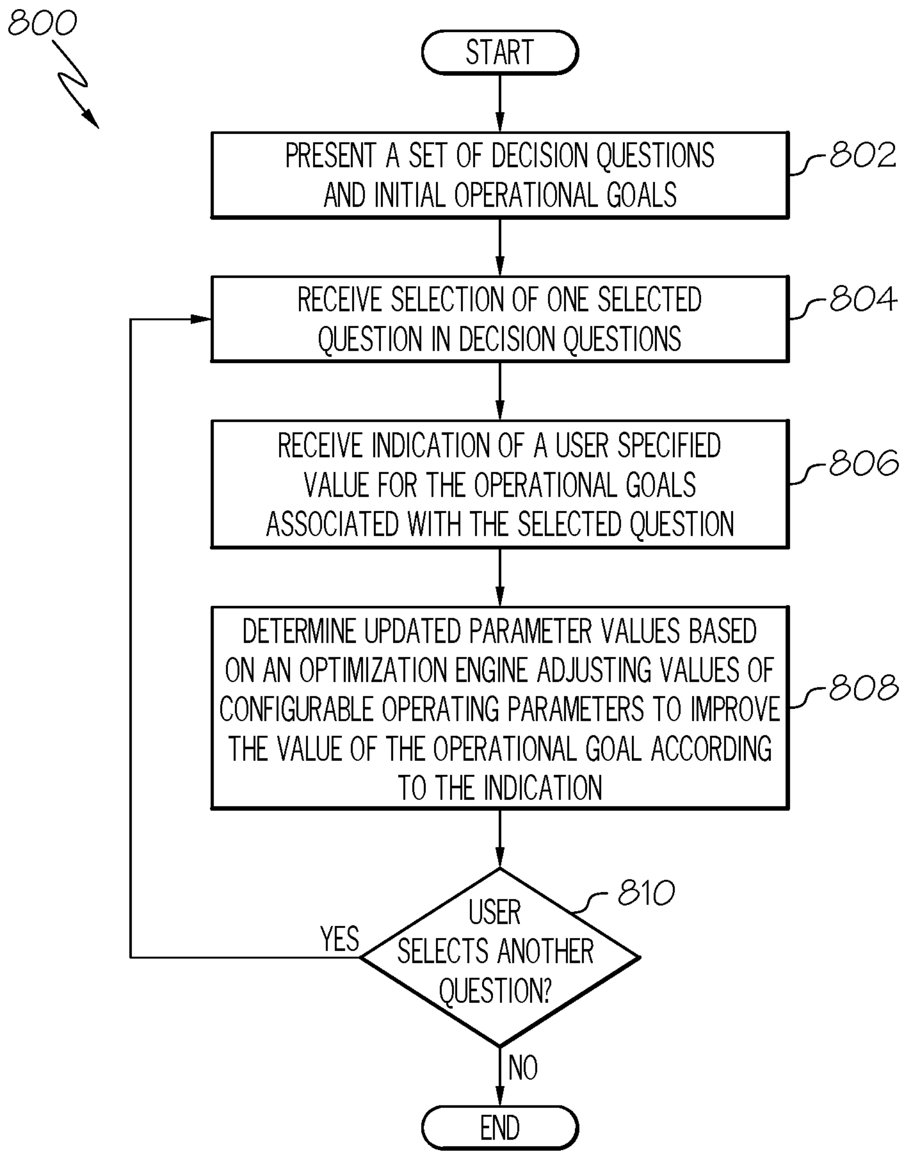
FIG. 8 illustrates a user directed parameter determination process, according to an example.

FIG. 8 illustrates a user directed parameter determination process 800, according to an example. The user directed parameter determination process 800 is an example of a process performed by the parameter determination system to allow a user to determine values for configurable parameters of a configurable operational system where the user is able to specify values, or ranges of values, for selected operational goals of the configurable operational system.

A set of decision questions along with a set of initial operational goal values is presented to a user, at 802. As described above with respect to the parameter determination process creation flow 700, decision questions are user friendly text questions that elicits value of an associated user configurable parameter from the user. The initial operational goal values in an example are values that have been determined prior to a user's specifying any goal indications. In an example, this user interface corresponds to the first user interface presentation 602 discussed above.

A selection of one selected decision question within the set of decision questions is received, at 804. An example of receiving such a selection is described above with regards to the second user interface presentation 604, where the user selects the first select box 640. In further examples, a user is able to select more than one question at this stage.

An indication of a user specified value, or range of values, as a goal indication for the operational goal associated with the selected decision question is received, at 806. An example of receiving such an indication is described above with regards to the second user interface presentation 604, where the user entered values into the first value box 642 and the first tolerance box 644. In various examples, the indication is able indicate a quantitative value, such as a particular value or a range of values, or a qualitative indicator, such as "Maximize" or "Minimize."

The parameter determination system 110 determines, at 808, updated values for operational goals based on an optimization engine adjusting values of configurable operational parameters used by the set of mathematical models of operations of the configurable operational system to improve the value of the operational goal associated with the selected second decision question in the direction of the selected goal indication by optimizing the mathematical models while limiting the user configurable parameters to the received user specified values. In some examples, this determination includes determining, for each operational goal, a time sequence of operational performance metrics where each operational performance metric indicates a value for the respective operational performance metric during a separate time interval, and then calculating updated values for the respective operational goals by aggregating values of each operational performance metric in the time sequence of operational performance metrics for the respective updated value for the each respective operational goal. Determining and calculating such time sequences advantageously allows determining configuration parameters and operational profiles for the configurable operational system to better control its operation and meet the requirements of the user.

A determination is made, at 810, as to whether the user desires to select another question to answer. If the user selects another question to answer, the processing returns to receiving, at 806, a selection of one selected decision question and continues as described above. If the user does not decide to select another question, the user directed parameter determination process 800 ends.

Figure 9:
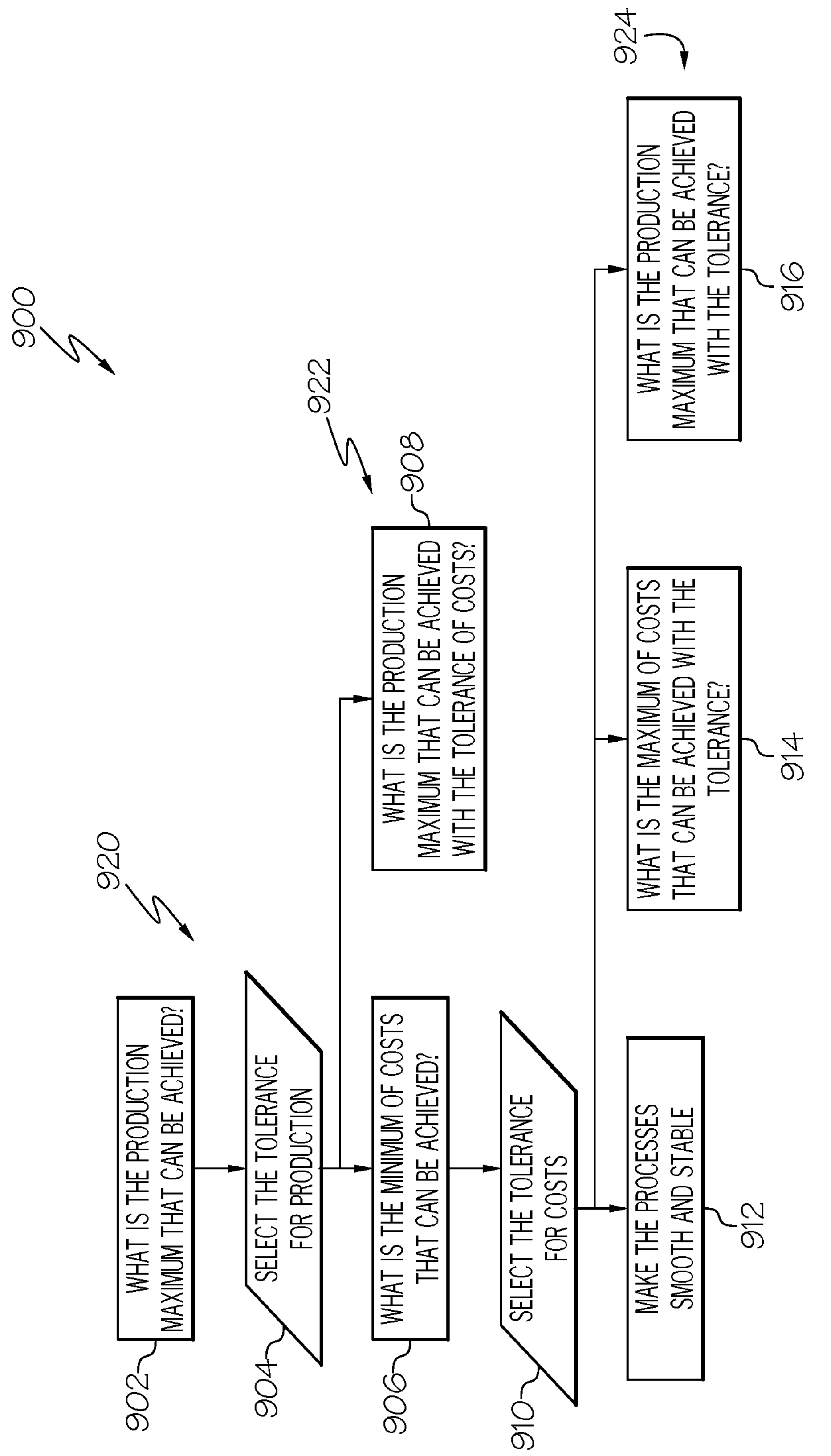
FIG. 9 illustrates an adaptive question tree structure, according to an example.

FIG. 9 illustrates an adaptive question tree structure 900, according to an example. The adaptive question tree structure 900 is an example of a user using a parameter determination system to determine parameter values by the user selecting questions of interest from a list of questions presented to the user.

The adaptive question tree structure 900 includes a first intermediate solution 920, which includes the user asking a first question, at 902, which is: "What is the Production Maximum that can be achieved?" The user then selects the allowable tolerance for the production, at 904. In various examples, the tolerance for the production is able to be specified as a lower limit that the user is willing to accept, an upper and lower limit, an upper limit, or any other suitable specification.

A second intermediate solution 922 is then performed, which includes in this example includes the user selecting the question, at 906, "What is the minimum of Costs that can be achieved?" and also selecting the question, at 908, "What is the Production maximum that can be achieved with the tolerance of costs?" The user then selects the tolerance for costs, at 910, which is the range of cots that the user is willing to accept.

A final solution, at 924, is performed. The adaptive question tree structure 900 depicts three (3) options for the final solution 924. Based on the configurable parameter values previously determined for the intermediate solutions, the user is able to determine configurable parameters in this illustrated final solution 924 by selecting one of the illustrated three (3) options. A first option is for the user to select "Make the Process Smooth and Stable" 912, which is a conservative option and results in the parameter determination system determining configurable parameters or the configurable operational system such that the system will operate smoothly and stably. A second option is for the user to select "What is the minimum of Costs that can be achieved with the tolerances" 914, which is an option that results in determining configurable parameters for the configurable operational system that minimizes the costs of inputs. A third option is for the user to select "What is the production maximum that can be achieved with the tolerances" 916, which is an option that results in determining configurable parameters for the configurable operational system that maximizes its production.

The adaptive question tree structure 900 depicts an example of defining the plurality of defined decision questions, where each decision question in the plurality of decision questions poses a business oriented question that elicits a value for a respective user configurable parameter within the plurality of user configurable parameters of the configurable operational system. A parameter determination system that has defined business oriented questions advantageously allows less technical business oriented personnel to determine configurable parameters for a configurable operational system.

Information Processing System

Figure 10:
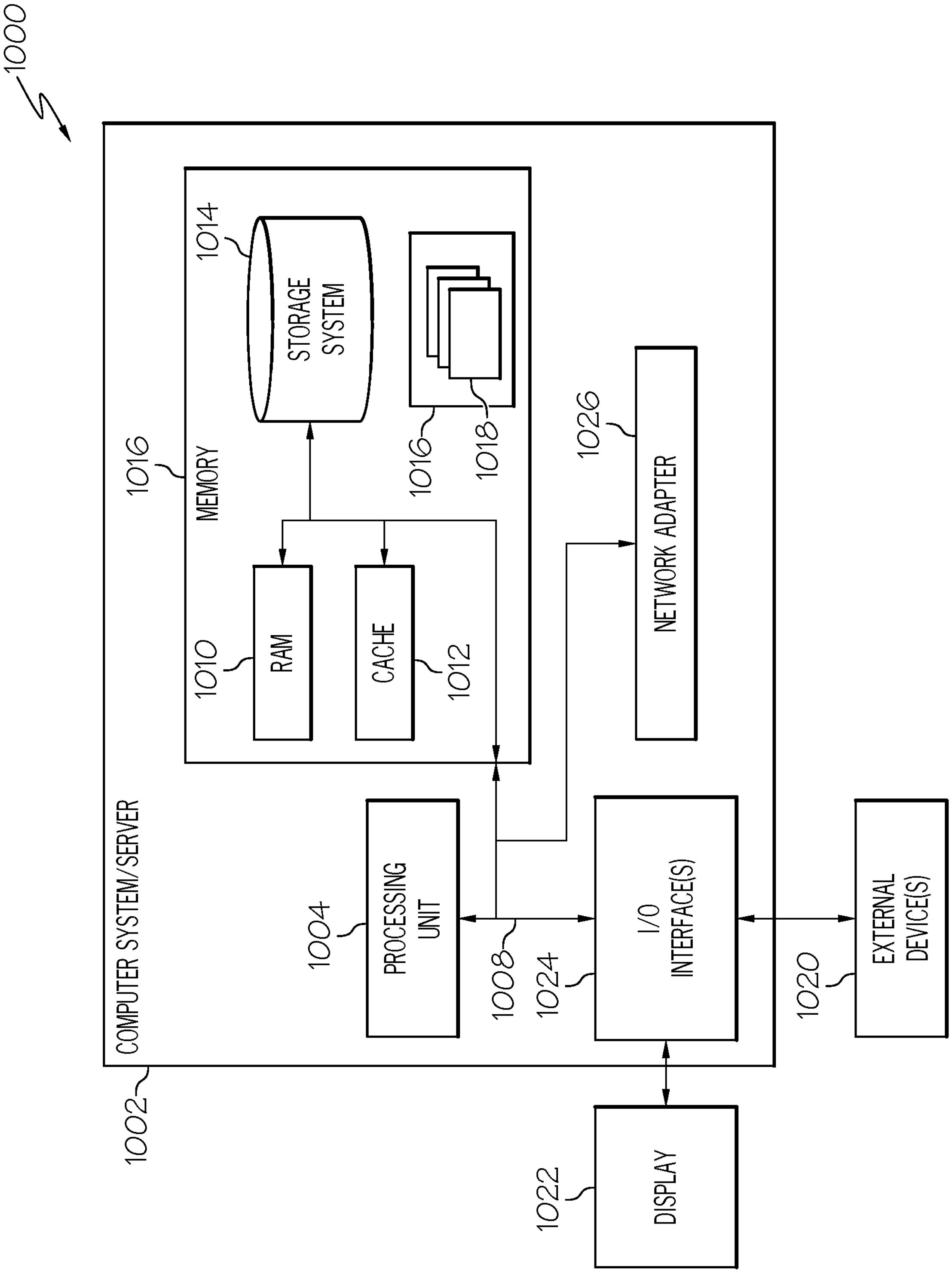
FIG. 10 is a block diagram illustrating one example of an information processing system according to one example.

Referring now to FIG. 10, this figure is a block diagram illustrating an information processing system that can be utilized in various examples of the present disclosure. The information processing system 1002 is based upon a suitably configured processing system configured to implement one or more embodiments of the present disclosure. Any suitably configured processing system can be used as the information processing system 1002 in embodiments of the present disclosure. In another embodiment, the information processing system 1002 is a special purpose information processing system configured to perform one or more embodiments discussed above. The components of the information processing system 1002 can include, but are not limited to, one or more processors or processing units 1004, a system memory 1006, and a bus 1008 that couples various system components including the system memory 1006 to the processor 1004.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1006 can also include computer system readable media in the form of volatile memory, such as random access memory (RAM) 1010 and/or cache memory 1012. The information processing system 1002 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product having a set of program modules that are configured to carry out the functions of various examples described above.

Program/utility 1016, having a set of program modules 1018, may be stored in memory 1006 by way of example, and not limitation, as well as an operational system, one or more application programs, other program modules, and program data. Each of the operational system, one or more application programs, other program modules, and program data or some combination thereof, may include an implementation of a networking environment. Program modules 1018 generally carry out the functions and/or methodologies of the above described processes and systems.

The information processing system 1002 can also communicate with one or more external devices 1020 such as a keyboard, a pointing device, a display 1022, and the like. The information processing system 1002 is further able to communicate with one or more devices that enable a user to interact with the information processing system 1002; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 1002. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining configurable parameters for a configurable operational system, the method comprising:

presenting, on a user interface, a first plurality of defined decision questions and corresponding key performance indicators (KPIs), wherein one or more of the KPIs include quantitative indications that are configured to limit the use of an input material to a predetermined range, wherein one or more of the KPIs include qualitative indications that are configured to maximize or minimize respective values of the configurable parameters, wherein the defined decision questions are related to a production objective of a manufacturing process where each decision question has a respective associated operational goal within a plurality of operational goals for the configurable operational system included in a product-driven manufacturing system, the configurable operational system including a number of underlying processes that each have physical or chemical transformations from raw materials or intermediate products to a next intermediate product associated with the manufacturing system, where any defined decision question within the first plurality of defined decision questions related to the production objective of the manufacturing process is selectable by a user for presentation in the user interface, and where each operational goal in the plurality of operational goals is defined by the user and is different from configurable operational parameters in the KPIs of the configurable operational system;

defining the plurality of operational goals;

defining the first plurality of defined decision questions, where defined decision questions in the first plurality of defined decision questions are arranged in a hierarchical structure, with each branch of the hierarchical structure setting forth a respective decision process within a plurality of operating scenarios for the configurable operational system, and where defining the first plurality of defined decision questions comprises defining an order to present the defined decision questions;

receiving, based on the presenting the first plurality of defined decision questions and the KPIs, a selection via the user interface of a selected decision question and selected values for the KPIs for presentation in the user interface within the first plurality of defined decision questions;

receiving, as a selected goal indication, an input via the user interface in association with the selected decision question;

determining a respective updated value for each respective operational goal within the plurality of operational goals where each respective updated value for each respective operational goal is determined based on an optimization engine adjusting values of configurable operational parameters in the KPIs used by a set of mathematical models of operations of the configurable operational system included in the product-driven manufacturing system to improve a value of a respective operational goal associated with the selected decision question in a direction of the selected goal indication received via the user interface, wherein the mathematical models include regression models that have been trained to characterize operation of subsystems in the configurable operational system, where determining the respective updated value for each respective operational goal comprises:

determining, for each respective operational goal, a time sequence of operational performance metrics, where each respective operational performance metric in the time sequence of operational performance metrics indicates a value for the respective operational performance metric during a separate time interval; and calculating the respective updated value for each respective operational goal by aggregating values of each operational performance metric in the time sequence of operational performance metrics for the respective updated value for each respective operational goal;

presenting on the user interface, based on determining the respective updated value for each respective operational goal, a second plurality of defined decision questions, where each respective defined decision question in the second plurality of defined decision questions is presented in association with the respective updated value for each respective operational goal associated with the respective defined decision question in the second plurality of defined decision questions;

receiving, based on the presenting the second plurality of defined decision questions, an indication of a tolerance value for a respective updated value of a tolerance value for the respective operational goal associated with the selected decision question;

receiving in the user interface, based on the presenting the second plurality of defined decision questions and the KPIs, a selection of a second selected decision question within the second plurality of defined decision questions and selected values for the KPIs, where the second selected decision question is different than the selected decision question;

receiving, as a second goal indication, a second input via the user interface in association with the second selected decision question;

determining a respective second updated value for each respective operational goal within the plurality of operational goals where each respective second updated value for each respective operational goal is determined based on the optimization engine adjusting values of configurable operational parameters in the KPIs used by the set of mathematical models of operations of the configurable operational system to improve a value of a respective operational goal associated with the selected second decision question in the direction of the selected second goal indication, where determining the respective second updated value for each respective operational goal within the plurality of operational goals comprises: limiting a value of the respective operational goal associated with the selected decision question to within the tolerance value of the respective operational goal associated with the selected decision question; and presenting on the user interface which received the selections, based on determining the respective second updated value for each configurable operational parameter, each of respective second updated operational goals based upon the respective second updated values, within the plurality of operational goals and a difference between each respective updated operational goal and each respective second updated operational goal, wherein the user interface is a computer interface which allows users to provide suitable inputs and the computer interface provides suitable outputs for the user, where the second plurality of defined decision questions comprises the first plurality of defined decision questions with the selected decision question removed, wherein the regression models correspond to respective processes in the configurable operational system, wherein the regression models are trained using data observed during operation of the respective subsystems over time under various conditions and/or values for the configurable operational parameters.

2. The method of claim 1, where the method further comprises defining the plurality of operational goals to comprise operational goals that cause the optimization engine to determine configurable operational parameters for the configurable operational system that drive at least one of system physical flow, chemical flow, inventory quantities, or operation smoothness.

3. The method of claim 1, where the selected goal indication is associated with at least one of a performance metric or a business constraint for the configurable operational system, where the at least one of a performance metric or a business constraint affects the respective operational goal for the selected decision question.

4. The method of claim 1, further comprising:

presenting on the user interface:

values for respective operational goals associated with the first plurality of defined decision questions and corresponding KPIS, the updated values for respective operational goals associated with the second plurality of defined decision questions and corresponding KPIs, and a difference between the values and the respective updated values; and in response to receiving a rejection of the values and the updated values, determining new values for the respective operational goals within the plurality of operational goals.

5. The method of claim 4, further comprising:

in response to receiving a selection of the values and/or the updated values, implementing the selected values and/or the selected updated values in the configurable operational system.

6. An apparatus for determining configurable parameters for a configurable operational system, the apparatus comprising:

a processor;

a memory coupled to the processor;

a user interface that, when operating, is configured to:

present a first plurality of defined decision questions and corresponding key performance indicators (KPIs), wherein one or more of the KPIs include quantitative indications that are configured to limit the use of an input material to a predetermined range, wherein one or more of the KPIs include qualitative indications that are configured to maximize or minimize respective values of the configurable parameters, wherein the defined decision questions are related to a production objective of a manufacturing process where each decision question has a respective associated operational goal within a plurality of operational goals for a configurable operational system included in a product-driven manufacturing system, the configurable operational system including a number of underlying processes that each have physical or chemical transformations from raw materials or intermediate products to a next intermediate product associated with the manufacturing system, where any defined decision question within the first plurality of defined decision questions related to the production objective of the manufacturing process is selectable by a user for presentation in the user interface, and where each operational goal in the plurality of operational goals is defined by the user and is different from configurable operational parameters in the KPIs of the configurable operational system;

define the plurality of operational goals;

define the first plurality of defined decision questions, where defined decision questions in the first plurality of defined decision questions are arranged in a hierarchical structure, with each branch of the hierarchical structure setting forth a respective decision process within a plurality of operating scenarios for the configurable operational system, and where defining the first plurality of defined decision questions comprises defining an order to present the defined decision questions;

receive, based on presentation of the first plurality of defined decision questions and the KPIs, a selection via the user interface of a selected decision question and selected values for the KPIs for presentation in the user interface within the first plurality of defined decision questions;

receive, as a selected goal indication, an input via the user interface in association with the selected decision question; and a parameter value determination processor that, when operating, is configured to:

determine a respective updated value for each respective operational goal within the plurality of operational goals where each respective updated value for each respective operational goal is determined based on an optimization engine adjusting values of configurable operational parameters in the KPIs used by a set of mathematical models of operations of the configurable operational system included in the product-driven manufacturing system to improve a value of a respective operational goal associated with the selected decision question in a direction of the selected goal indication received via the user interface, wherein the mathematical models include regression models that have been trained to characterize operation of subsystems in the configurable operational system, where determining the respective updated value for each respective operational goal comprises:

determining, for each respective operational goal, a time sequence of operational performance metrics, where each respective operational performance metric in the time sequence of operational performance metrics indicates a value for the respective operational performance metric during a separate time interval; and calculating the respective updated value for each respective operational goal by aggregating values of each operational performance metric in the time sequence of operational performance metrics for the respective updated value for each respective operational goal, where the user interface is further configured to, when operating:

present on the user interface, based on a determination of the respective updated value for each respective operational goal, a second plurality of defined decision questions, where each respective defined decision question in the second plurality of defined decision questions is presented in association with the respective updated value for each respective operational goal associated with the respective defined decision question in the second plurality of defined decision questions;

receive, based on the presenting the second plurality of defined decision questions, an indication of a tolerance value for a respective updated value of a tolerance value for the respective operational goal associated with the selected decision question;

receive in the user interface, based on presentation of the second plurality of defined decision questions and the KPIs, a selection of a second selected decision question within the second plurality of defined decision questions and selected values for the KPIs, where the second selected decision question is different than the selected decision question;

receive, based on presentation of the second plurality of defined decision questions, an indication of a tolerance value for a respective updated value of a tolerance value for the respective operational goal associated with the selected decision question; and receive, as a second goal indication, a second input in association with the second selected decision question, and where the parameter value determination processor is further configured to, when operating:

determine a respective second updated value for each respective operational goal within the plurality of operational goals where each respective second updated value for each respective operational goal is determined based on the optimization engine adjusting values of configurable operational parameters in the KPIs used by the set of mathematical models of operations of the configurable operational system to improve a value of a respective operational goal associated with the selected second decision question in the direction of the selected second goal indication, where determining the respective second updated value for each respective operational goal within the plurality of operational goals comprises: limiting a value of the respective operational goal associated with the selected decision question to within the tolerance value of the respective operational goal associated with the selected decision question; and present on the user interface which received the selections, based on a determination of the respective second updated value for each configurable operational parameter, each of respective second updated operational goals based upon the respective second updated values, within the plurality of operational goals and a difference between each respective updated operational goal and each respective second updated operational goal, wherein the user interface is a computer interface which allows users to provide suitable inputs and the computer interface provides suitable outputs for the user, where the selected goal indication is associated with at least one of a performance metric or a business constraint for the configurable operational system, where the at least one of a performance metric or a business constraint affects the respective operational goal for the selected decision question.

7. The apparatus of claim 6, where the configurable operational system comprises a manufacturing system, and where the parameter value determination processor is further configured to, when operating, define the plurality of operational goals to comprise operational goals that cause the optimization engine to determine configurable operational parameters for the configurable operational system that drive at least one of system physical flow, chemical flow, inventory quantities, or operation smoothness.

8. The apparatus of claim 6, where the second plurality of defined decision questions comprises the first plurality of defined decision questions with the selected decision question removed, wherein the regression models correspond to respective processes in the configurable operational system, wherein the regression models are trained using data observed during operation of the respective subsystems over time under various conditions and/or values for the configurable parameters.

9. A computer program product for determining configurable parameters for a configurable operational system, the computer program product comprising:

a storage medium readable by a processing circuit and storing instructions for execution by the processing circuit for performing a method comprising:

presenting, on a user interface, a first plurality of defined decision questions and corresponding key performance indicators (KPIs), wherein one or more of the KPIs include quantitative indications that are configured to limit the use of an input material to a predetermined range, wherein one or more of the KPIs include qualitative indications that are configured to maximize or minimize respective values of the configurable parameters, wherein the defined decision questions are related to a production objective of a manufacturing process where each decision question has a respective associated operational goal within a plurality of operational goals for a configurable operational system included in a product-driven manufacturing system, the configurable operational system including a number of underlying processes that each have physical or chemical transformations from raw materials or intermediate products to a next intermediate product associated with the manufacturing system, where any defined decision question within the first plurality of defined decision questions related to the production objective of the manufacturing process is selectable by a user for presentation in the user interface, and where each operational goal in the plurality of operational goals is defined by the user and is different from configurable operational parameters in the KPIs of the configurable operational system;

defining the plurality of operational goals to comprise operational goals that cause an optimization engine to determine configurable operational parameters for the configurable operational system that drive at least one of system physical flow, chemical flow, inventory quantities, or operation smoothness;

defining the first plurality of defined decision questions, where defined decision questions in the first plurality of defined decision questions are arranged in a hierarchical structure, with each branch of the hierarchical structure setting forth a respective decision process within a plurality of operating scenarios for the configurable operational system, and where defining the first plurality of defined decision questions comprises defining an order to present the defined decision questions;

receiving, based on the presenting the first plurality of defined decision questions and the KPIs, a selection via the user interface of a selected decision question and selected values for the KPIs for presentation in the user interface within the first plurality of defined decision questions;

receiving, as a selected goal indication, an input via the user interface in association with the selected decision question;

determining a respective updated value for each respective operational goal within the plurality of operational goals where each respective updated value for each respective operational goal is determined based on an optimization engine adjusting values of configurable operational parameters in the KPIs used by a set of mathematical models of operations of the configurable operational system included in the product-driven manufacturing system to improve a value of a respective operational goal associated with the selected decision question in a direction of the selected goal indication received via the user interface, wherein the mathematical models include regression models that have been trained to characterize operation of subsystems in the configurable operational system, wherein the regression models correspond to respective processes in the configurable operational system, wherein the regression models are trained using data observed during operation of the respective subsystems over time under various conditions and/or values for the configurable operational parameters;

presenting on the user interface, based on determining the respective updated value for each respective operational goal, a second plurality of defined decision questions, where each respective defined decision question in the second plurality of defined decision questions is presented in association with the respective updated value for each respective operational goal associated with the respective defined decision question in the second plurality of defined decision questions;

receiving, based on the presenting the second plurality of defined decision questions, an indication of a tolerance value for a respective updated value of a tolerance value for the respective operational goal associated with the selected decision question;

receiving in the user interface, based on the presenting the second plurality of defined decision questions and the KPIs, a selection of a second selected decision question within the second plurality of defined decision questions and selected values for the KPIs, where the second selected decision question is different than the selected decision question;

receiving, as a second goal indication, a second input via the user interface in association with the second selected decision question;

determining a respective second updated value for each respective operational goal within the plurality of operational goals where each respective second updated value for each respective operational goal is determined based on the optimization engine adjusting values of configurable operational parameters in the KPIs used by the set of mathematical models of operations of the configurable operational system to improve a value of a respective operational goal associated with the selected second decision question in the direction of the selected second goal indication, where determining the respective second updated value for each respective operational goal within the plurality of operational goals comprises:

limiting a value of the respective operational goal associated with the selected decision question to within the tolerance value of the respective operational goal associated with the selected decision question, determining, for each respective operational goal, a time sequence of operational performance metrics, where each respective operational performance metric in the time sequence of operational performance metrics indicates a value for the respective operational performance metric during a separate time interval, and calculating the respective updated value for each respective operational goal by aggregating values of each operational performance metric in the time sequence of operational performance metrics for the respective updated value for each respective operational goal; and presenting on the user interface which received the selections, based on determining the respective second updated value for each configurable operational parameter, each of respective second updated operational goals based upon the respective second updated values, within the plurality of operational goals and a difference between each respective updated operational goal and each respective second updated operational goal, wherein the user interface is a computer interface which allows users to provide: suitable inputs and the computer interface provides suitable outputs for the user, where the configurable operational system comprises a manufacturing system.

10. The computer program product of claim 9, where the second plurality of defined decision questions comprises the first plurality of defined decision questions with the selected decision question removed.

* * * * *